(12) United States Patent
Cui et al.

(10) Patent No.: US 9,699,760 B2
(45) Date of Patent: Jul. 4, 2017

(54) POSITIONING PROCESSING METHOD, APPARATUS, AND SYSTEM

(71) Applicant: HUAWEI TECHNOLOGIES CO., LTD., Shenzhen (CN)

(72) Inventors: Jie Cui, Tokyo (JP); Dengkun Xiao, Shenzhen (CN); Zhuo Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 29 days.

(21) Appl. No.: 14/800,218

(22) Filed: Jul. 15, 2015

(65) Prior Publication Data
US 2015/0319731 A1 Nov. 5, 2015

Related U.S. Application Data

(63) Continuation of application No. PCT/CN2013/070526, filed on Jan. 16, 2013.

(51) Int. Cl.
*H04W 64/00* (2009.01)
*G01S 5/10* (2006.01)
(Continued)

(52) U.S. Cl.
CPC ............ *H04W 64/003* (2013.01); *G01S 5/10* (2013.01); *H04W 64/00* (2013.01); *H04W 88/02* (2013.01); *H04W 88/08* (2013.01)

(58) Field of Classification Search
CPC . H04W 36/0094; H04W 24/10; H04W 24/02; H04W 88/06; H04W 72/1215;
(Continued)

(56) References Cited

U.S. PATENT DOCUMENTS 7,379,744 B2 * 5/2008 Tamaki ................. H04W 64/00
342/126
8,200,251 B2 * 6/2012 Huang ................. G06F 17/3087
455/404.2
(Continued)

FOREIGN PATENT DOCUMENTS

CN 1710986 12/2005
CN 101047954 10/2007
(Continued)

OTHER PUBLICATIONS

International Search Report mailed Oct. 17, 2013, in corresponding International Application PCT/CN2013/070526.
(Continued)

*Primary Examiner* — Lester Kincaid
*Assistant Examiner* — Gary Lafontant
(74) *Attorney, Agent, or Firm* — Staas & Halsey LLP

(57) ABSTRACT

Embodiments of the present invention provide a positioning processing method, apparatus, and system. The method includes: acquiring coexistence interference information of a terminal; instructing, according to the coexistence interference information, the terminal to perform measurement on a suitable positioning signal resource; and positioning the terminal based on a positioning measurement result reported by the terminal. According to the positioning processing method, apparatus, and system provided in the embodiments of the present invention, precision of terminal positioning can be improved.

24 Claims, 12 Drawing Sheets

(51) Int. Cl.
*H04W 88/02* (2009.01)
*H04W 88/08* (2009.01)

(58) Field of Classification Search
CPC . H04W 36/20; H04W 72/082; H04W 52/244; H04W 52/365; H04W 16/14; H04W 88/02; H04W 64/00; H04W 64/003; H04W 28/048; H04W 88/08; H04W 88/10; H04W 52/24
USPC ..................................................... 455/456.1
See application file for complete search history.

(56) References Cited

U.S. PATENT DOCUMENTS

| | | | | |
|---|---|---|---|---|
| 9,042,917 | B2* | 5/2015 | Edge | ............... H04W 64/00 342/453 |
| 2012/0087341 | A1 | 4/2012 | Jang et al. | |
| 2012/0182896 | A1 | 7/2012 | Jang et al. | |
| 2013/0324172 | A1* | 12/2013 | Ahn | ............... H04W 36/0094 455/501 |

FOREIGN PATENT DOCUMENTS

| | | |
|---|---|---|
| CN | 101494476 | 7/2009 |
| CN | 101772160 A | 7/2010 |
| CN | 102186191 | 9/2011 |
| CN | 102457960 | 5/2012 |
| WO | 2012/108733 A2 | 8/2012 |

OTHER PUBLICATIONS

PCT International Search Report dated Oct. 17, 2013 in corresponding International Patent Application No. PCT/CN2013/070526.
"3$^{rd}$ Generation Partnership Project; Technical Specification Group Radio Access Network; Evolved Universal Terrestrial Radio Access (E-UTRA); LTE Positioning Protocol (LPP) (Release 11)", 3GPP TS 36.355, V11.1.0, Dec. 2012, pp. 1-117.
"3$^{rd}$ Generation Partnership Project; Technical Specification Group Radio Access Network; Evolved Universal Terrestrial Radio Access (E-UTRA); LTE Positioning Protocol A (LPPa) (Release 11)" 3GPP TS 36.455, V11.1.0, Dec. 2012, pp. 1-52.
Chinese Office Action dated Mar. 29, 2017 in corresponding Chinese Patent Application No. 201380001986.8.

* cited by examiner

POSITIONING PROCESSING METHOD, APPARATUS, AND SYSTEM

CROSS-REFERENCE

This application is a continuation of International Application No. PCT/CN2013/070526, filed on Jan. 16, 2013, which is hereby incorporated by reference in its entirety.

TECHNICAL FIELD

The present invention relates to wireless communications technologies, and in particular, to a positioning processing method, apparatus, and system.

BACKGROUND

A positioning technology is a service for directly or indirectly obtaining geographic location information of a terminal by using a resource in a wireless communications network. OTDOA (Observed Time Difference of Arrival) positioning is a common terminal positioning method.

A principle of the OTDOA positioning is as follows: When three or more than three base stations exist in a wireless cellular network, a positioning server on a network side can determine a location of a terminal according to a time difference of arrivals, at the terminal, of downlink transmission signals sent by different base stations. FIG. 1 is a schematic diagram of a principle of OTDOA positioning in the prior art. As shown in FIG. 1, a serving base station of a cell in which a terminal 105 is located is a first base station 100, and a second base station 101 and a third base station 102 also exist in a wireless cellular network, where a distance of the terminal 105 to the first base station 100 is $d_0$, a distance of the terminal 105 to the second base station 101 is $d_1$, and a distance of the terminal 105 to the third base station 102 is $d_2$; and the first base station 100, the second base station 101, and the third base station 102 may be selected as positioning base stations of the terminal 105. After the positioning server designates a sending and receiving configuration of a PRS (Positioning Reference Signal, positioning reference signal) for each positioning base station and the terminal, the three base stations sends a PRS to the terminal at the same time, and the terminal receives the PRS sent by each the positioning base station, and identifies a time location of a first-arrival path for each PRS. Then a time difference of arrivals of the PRSs of the different base stations may be obtained, and the time difference may be reported to the positioning server. The positioning server may map the time difference of the arrivals of the signals that are received by the terminal and sent by the different base stations to a difference of distances between the terminal and the different positioning base stations. Then it can be learned from a definition of a hyperbola that, points, a difference of whose distances to two fixed points is a constant value, constitute a hyperbola. For example, in FIG. 1, a difference between the distance of the terminal 105 to the first base station 100 and the distance of the terminal 105 to the second base station 101 is $d_1$-$d_0$, which corresponds to a first hyperbola 103; a difference between the distance of the terminal 105 to the second base station 101 and the distance of the terminal 105 to the third base station 102 is $d_2$-$d_1$, which corresponds to a second hyperbola 104; then, a point of intersection between the first hyperbola 103 and the second hyperbola 104 is a location of the terminal 105. When a quantity of base stations existing in the system increases, precision of terminal positioning can be improved.

At present, a multi-mode terminal has become a trend of terminal device development, for example, a terminal not only can support an ISM (Industrial Scientific & Medical) frequency band, but also can support an LIE (Long Term Evolution) frequency band. Some new interference may be introduced to the multi-mode terminal due to coexistence of the LTE frequency band and the ISM frequency band, for example, IDC (in-device coexistence) interference, interference caused by a WiFi (Wireless Fidelity) or Bluetooth signal transmitted by the terminal to reception of an LTE signal by the terminal, interference caused by an LIE signal sent by the terminal to reception of a GPS (Global Positioning System) signal by the terminal, and interference caused by an LIE signal sent by the terminal to reception of a WiFi or Bluetooth signal by the terminal.

Therefore, in an OTDOA positioning process, if there is an interference signal that affects positioning signal reception, measurement on a time difference of a arrivals of positioning signals is affected, and as a result, an error of terminal positioning is increased.

SUMMARY

Embodiments of the present invention provide a positioning processing method, apparatus, and system, so as to improve precision of terminal positioning.

According to a first aspect, an embodiment of the present invention provides a positioning processing method, including:

acquiring coexistence interference information of a terminal;

instructing, according to the coexistence interference information, the terminal to perform measurement on a suitable positioning signal resource; and positioning the terminal based on a positioning measurement result reported by the terminal.

In a first possible implementation manner of the first aspect, if the coexistence interference information includes information about suitability of a frequency domain transmission resource, time domain transmission resource, and/or code domain transmission resource for the terminal, the instructing, according to the coexistence interference information, the terminal to perform measurement on a suitable positioning signal resource includes:

designating, for the terminal according to the coexistence interference information, a suitable frequency domain transmission resource, time domain transmission resource, and/or code domain transmission resource as a positioning signal measurement resource suitable for the terminal to perform positioning measurement.

In a second possible implementation manner of the first aspect, the positioning the terminal based on a positioning measurement result reported by the terminal includes:

providing, for the terminal, a designated positioning signal measurement resource as auxiliary data for positioning measurement, where the auxiliary data includes at least sending timing and/or a sending frequency;

receiving a time difference that is obtained by the terminal by means of measurement based on the auxiliary data and is of arrivals, at the terminal, of positioning signals from different positioning base stations; and performing calculation according to the time difference to obtain a difference of distances between the terminal and the different positioning base stations, and determining a location of the terminal according to the difference of the distances.

With reference to the first aspect or the first possible implementation manner of the first aspect or the second possible implementation manner of the first aspect, in a third possible implementation manner, the acquiring coexistence interference information of a terminal includes:

receiving the coexistence interference information actively reported by the terminal.

With reference to the first aspect or the first possible implementation manner of the first aspect or the second possible implementation manner of the first aspect, in a fourth possible implementation manner, the acquiring coexistence interference information of a terminal includes:

sending, to the terminal, a request for reporting the coexistence interference information; and receiving the coexistence interference information directly reported by the terminal, or forwarded by a base station, or forwarded by an MME and an OAM.

With reference to the first aspect or the first possible implementation manner of the first aspect or the second possible implementation manner of the first aspect, in a fifth possible implementation manner, the acquiring coexistence interference information of a terminal includes:

receiving the coexistence interference information of the terminal that is provided by a base station, an MME or an OAM.

With reference to the first aspect or the first possible implementation manner of the first aspect or the second possible implementation manner of the first aspect, in a sixth possible implementation manner, the acquiring coexistence interference information of a terminal includes:

sending, to a base station, an MME and an OAM, a request for reporting the coexistence interference information of the terminal; and receiving the coexistence interference information sent by the base station, or forwarded by the MME and the OAM.

With reference to the first aspect or the first possible implementation manner of the first aspect or the second possible implementation manner of the first aspect, in a seventh possible implementation manner, the acquiring coexistence interference information of a terminal includes:

receiving coexistence interference information of a single terminal or multiple terminals that is provided by a base station, an MME or an OAM.

With reference to the first aspect or the fourth possible implementation manner of the first aspect or the fifth possible implementation manner of the first aspect or the sixth possible implementation manner of the first aspect or the seventh possible implementation manner of the first aspect, in an eighth possible implementation manner, the receiving coexistence interference information provided by a base station includes:

receiving signaling that carries the coexistence interference information and is sent by the base station, where the signaling includes information about a carrier list unsuitable or suitable when coexistence interference exists in the terminal, and/or information about a time domain resource unsuitable or suitable when coexistence interference exists in the terminal, and/or information about a code domain resource unsuitable or suitable when coexistence interference exists in the terminal; and using the included information as the coexistence interference information.

In a ninth possible implementation manner of the first aspect, before the acquiring coexistence interference information of a terminal, the method further includes:

when it is identified that the terminal is in a coverage range of a WiFi access point, acquiring a coverage radius of the WiFi access point; and when it is determined that the coverage radius of the WiFi access point is less than a set threshold, acquiring a location of the WiFi access point and using the location of the WiFi access point as a location of the terminal; or when it is determined that the coverage radius of the WiFi access point is not less than a set threshold, triggering the operation of acquiring the coexistence interference information of the terminal.

With reference to the first aspect or the ninth possible implementation manner of the first aspect, in a tenth possible implementation manner, the acquiring a location of the WiFi access point includes:

acquiring, from the terminal, the location of the WiFi access point;

sending a location acquiring request to the WiFi access point and receiving the location returned by the WiFi access point; and querying a local database to acquire the location of the WiFi access point.

According to a second aspect, an embodiment of the present invention provides a positioning processing method, including:

providing coexistence interference information of a terminal for a positioning server;

acquiring a positioning signal measurement resource designated according to the coexistence interference information by the positioning server; and performing positioning measurement based on the designated positioning signal measurement resource.

In a first possible implementation manner of the second aspect, the providing coexistence interference information of a terminal for a positioning server includes:

when a request, which is sent by the positioning server, for reporting the coexistence interference information is received, or the terminal determines that the coexistence interference information needs to be reported, directly reporting, or forwarding by using a base station, or forwarding by using an MME and an OAM, the coexistence interference information of the terminal to the positioning server.

According to a third aspect, an embodiment of the present invention provides a positioning processing apparatus on a server side, including:

an acquiring module, configured to acquire coexistence interference information of a terminal;

an instructing module, configured to instruct, according to the coexistence interference information, the terminal to perform measurement on a suitable positioning signal resource; and a positioning module, configured to position the terminal based on a positioning measurement result reported by the terminal.

In a first possible implementation manner of the third aspect, if the coexistence interference information includes information about suitability of a frequency domain transmission resource, time domain transmission resource, and/or code domain transmission resource for the terminal, the instructing module is specifically configured to designate, for the terminal according to the coexistence interference information, a suitable frequency domain transmission resource, time domain transmission resource, and/or code domain transmission resource as a positioning signal measurement resource suitable for the terminal to perform positioning measurement In a second possible implementation manner of the third aspect, the positioning module includes:

an auxiliary data providing unit, configured to provide, for the terminal, a designated positioning signal measurement resource as auxiliary data for positioning measurement, where the auxiliary data includes at least sending timing and/or a sending frequency;

a time difference receiving unit, configured to receive a time difference that is obtained by the terminal by means of measurement based on the auxiliary data and is of arrivals, at the terminal, of positioning signals from different positioning base stations; and a location calculating unit, configured to perform calculation according to the time difference to obtain a difference of distances between the terminal and the different positioning base stations, and determine a location of the terminal according to the difference of the distances.

With reference to the third aspect or the first possible implementation manner of the third aspect or the second possible implementation manner of the third aspect, in a third possible implementation manner, the acquiring module is specifically configured to receive the coexistence interference information actively reported by the terminal.

With reference to the third aspect or the first possible implementation manner of the third aspect or the second possible implementation manner of the third aspect, in a fourth possible implementation manner, the acquiring module is specifically configured to send, to the terminal, a request for reporting the coexistence interference information; and receive the coexistence interference information directly reported by the terminal, or forwarded by a base station, or forwarded by an MME and an OAM.

With reference to the third aspect or the first possible implementation manner of the third aspect or the second possible implementation manner of the third aspect, in a fifth possible implementation manner, the acquiring module is specifically configured to receive the coexistence interference information of the terminal that is provided by a base station, an MME or an OAM.

With reference to the third aspect or the first possible implementation manner of the third aspect or the second possible implementation manner of the third aspect, in a sixth possible implementation manner, the acquiring module is specifically configured to send, to a base station, an MME and an OAM, a request for reporting the coexistence interference information of the terminal; and receive the coexistence interference information sent by the base station, or forwarded by the MME and the OAM.

With reference to the third aspect or the first possible implementation manner of the third aspect or the second possible implementation manner of the third aspect, in a seventh possible implementation manner, the acquiring module is specifically configured to receive coexistence interference information of a single terminal or multiple terminals that is provided by a base station, an MME or an OAM.

With reference to the third aspect or the fourth possible implementation manner of the third aspect or the fifth possible implementation manner of the third aspect or the sixth possible implementation manner of the third aspect or the seventh possible implementation manner of the third aspect, in an eighth possible implementation manner, the acquiring module is specifically configured to receive signaling that carries the coexistence interference information and is sent by the base station, where the signaling includes information about a carrier list unsuitable or suitable when coexistence interference exists in the terminal, and/or information about a time domain resource unsuitable or suitable when coexistence interference exists in the terminal, and/or information about a code domain resource unsuitable or suitable when coexistence interference exists in the terminal; and use the included information as the coexistence interference information.

In a ninth possible implementation manner of the third aspect, the apparatus further includes:

a coverage radius acquiring module, configured to, when it is identified that the terminal is in a coverage range of a WiFi access point, acquire a coverage radius of the WiFi access point; and a location acquiring module, configured to, when it is determined that the coverage radius of the WiFi access point is less than a set threshold, acquire a location of the WiFi access point and use the location of the WiFi access point as a location of the terminal; or a determining and triggering module, configured to, when it is determined that the coverage radius of the WiFi access point is not less than a set threshold, trigger the operation of acquiring the coexistence interference information of the terminal.

With reference to the third aspect or the ninth possible implementation manner of the third aspect, in a tenth possible implementation manner, the location acquiring module includes:

an access point location acquiring unit, configured to acquire, from the terminal, the location of the WiFi access point;

a location returning unit, configured to send a location acquiring request to the WiFi access point and receive the location returned by the WiFi access point; and a location acquiring unit, configured to query a local database to acquire the location of the WiFi access point.

According to a fourth aspect, an embodiment of the present invention provides a positioning processing apparatus on a terminal side, including:

an interference information providing module, configured to provide coexistence interference information of a terminal for a positioning server;

a measurement resource acquiring module, configured to acquire a positioning signal measurement resource designated according to the coexistence interference information by the positioning server; and a positioning measuring module, configured to perform positioning measurement based on the designated positioning signal measurement resource.

In a first possible implementation manner of the fourth aspect, the interference information providing module is specifically configured to, when a request, which is sent by the positioning server, for reporting the coexistence interference information is received, or the terminal determines that the coexistence interference information needs to be reported, directly report, or forward by using a base station, or forward by using an MME and an OAM, the coexistence interference information of the terminal to the positioning server.

According to a fifth aspect, an embodiment of the present invention provides a positioning system, including:

a positioning server and a user terminal, where the positioning server is the positioning processing apparatus on a server side according to any embodiment of the present invention, and the user terminal is the positioning processing apparatus on a terminal side according to any embodiment of the present invention.

According to the technical solutions provided in the embodiments of the present invention, in a process in which OTDOA positioning is performed on a user terminal, a positioning server acquires coexistence interference information of the terminal, and designates a positioning signal measurement resource for the terminal according to the coexistence interference information, which reduces impact of a coexistence interference signal on a positioning signal, and improves precision of terminal positioning.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Figure 1:
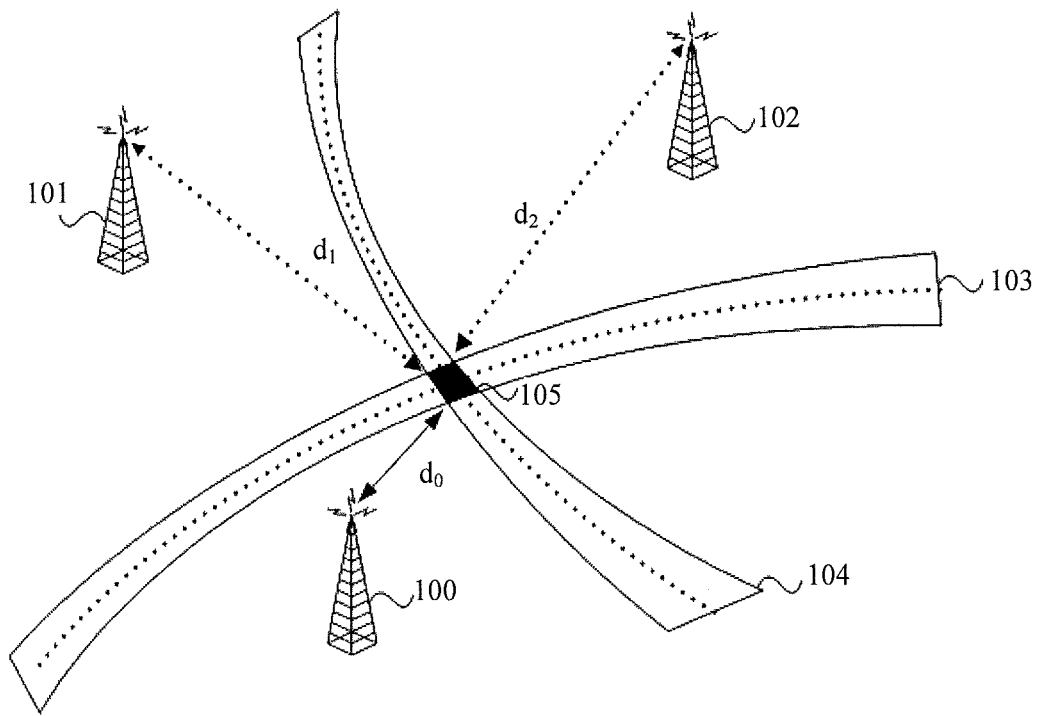
FIG. 1 is a schematic diagram of an OTDOA positioning principle in the prior art.
Figure 2:
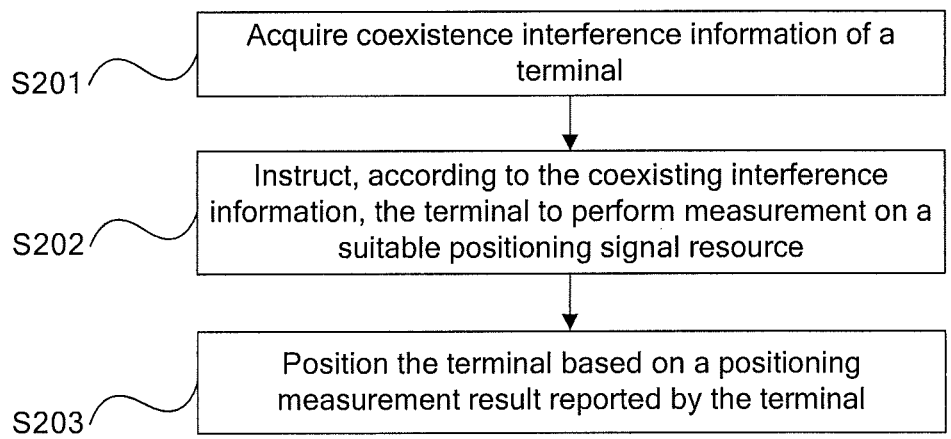
FIG. 2 is a flowchart of Embodiment 1 of a positioning processing method according to the present invention.

FIG. 2 is a flowchart of Embodiment 1 of a positioning processing method according to the present invention. The processing method in this embodiment is applicable to positioning a user terminal in an OTDOA positioning manner. This method may be executed by a positioning server, or may be executed by another positioning processing apparatus on a server side. As shown in FIG. 2, the method in this embodiment may include:

S201. Acquire coexistence interference information of a terminal.

In a process in which the positioning server positions the user terminal in the OTDOA positioning manner, the positioning server first acquires coexistence interference information of the terminal, and then may designate a suitable positioning signal measurement resource for the terminal according to the coexistence interference information, so that the terminal performs positioning measurement. Coexistence interference refers to interference between a cellular mobile communications system and WIFI and/or Bluetooth and/or GPS, and the like.

S202. Instruct, according to the coexistence interference information, the terminal to perform measurement on a suitable positioning signal resource.

After acquiring the coexistence interference information of the terminal, the positioning server may designate a suitable positioning signal measurement resource for the terminal to perform positioning measurement, where a positioning signal includes but is not limited to a positioning reference signal (PRS). For example, the coexistence interference information of the terminal that is acquired by the positioning server may be information about a frequency domain resource, time domain resource, and/or code domain resource on which the terminal is severely interfered or that is unsuitable for the terminal to perform positioning measurement; or may be information about a frequency domain resource, time domain resource, and/or code domain resource on which the terminal is not severely interfered or is suitable for the terminal to perform positioning measurement. Therefore, the positioning server may designate, for the terminal, a frequency domain resource, time domain resource, and/or code domain resource on which the terminal is not affected by coexistence interference or the terminal is not severely affected by coexistence interference as a resource for measuring a positioning signal; and instruct, by using auxiliary data, the terminal to perform positioning measurement on the suitable positioning signal measurement resource.

S203. Position the terminal based on a positioning measurement result reported by the terminal.

Specifically, the positioning server designates the suitable positioning signal measurement resource for the terminal according to the coexistence interference information, and notifies the suitable positioning signal measurement resource to the terminal by using the auxiliary data; the terminal receives, according to an instruction of the auxiliary data, PRSs sent by positioning base stations, records time points at which the PRSs sent by the positioning base stations are received, to obtain a time difference of arrivals, at the terminal, of the PRSs sent by the positioning base stations, and reports the time difference to the positioning server; and the positioning server determines a location of the terminal by means of mathematical calculation according to a difference of times at which the PRSs sent by the different positioning base stations are received.

In this embodiment, in a process in which OTDOA positioning is performed on a user terminal, a positioning server acquires coexistence interference information of the terminal, and designates a suitable positioning signal measurement resource according to the coexistence interference information for the terminal to perform measurement, which reduces impact of an interference signal on a positioning signal, and improves precision of terminal positioning.

In the positioning processing method described above, if the coexistence interference information includes information about suitability of a frequency domain transmission resource, time domain transmission resource, and/or code domain transmission resource for the terminal, the instructing, according to the coexistence interference information, the terminal to perform measurement on a suitable positioning signal resource may specifically include:

designating, for the terminal according to the coexistence interference information, a suitable frequency domain transmission resource, time domain transmission resource, and/or code domain transmission resource as a positioning signal measurement resource suitable for the terminal to perform positioning measurement.

Specifically, the coexistence interference information of the terminal may include information about a suitable frequency domain resource of the terminal or information about an unsuitable frequency domain resource of the terminal, and/or information about a suitable time domain resource of the terminal or information about an unsuitable time domain resource of the terminal, and/or information about a suitable code domain resource of the terminal or information about an unsuitable code domain resource of the terminal. For example, in an LTE network, a frequency domain resource, time domain resource, and code domain resource that are interfered by IDC or are severely interfered by IDC are information about an unsuitable frequency domain resource, time domain resource, and code domain resource of the terminal; and a frequency domain resource, time domain resource, and code domain resource that are not interfered by IDC or are not severely interfered by IDC are information about a suitable frequency domain resource, time domain resource, and code domain resource of the terminal.

In this embodiment, in a process in which OTDOA positioning is performed on a user terminal, a positioning server designates a suitable frequency domain resource, time domain resource, and/or code domain resource for the terminal according to coexistence interference information of the terminal to perform positioning measurement, which reduces impact of an interference signal on a positioning signal and improves precision of terminal positioning.

Figure 3:
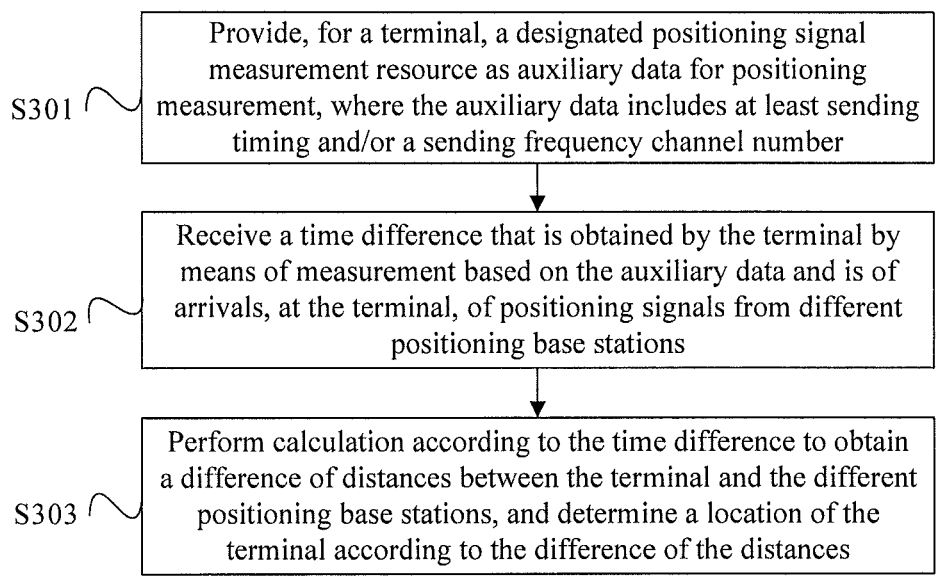
FIG. 3 is a flowchart of Embodiment 2 of a positioning processing method according to the present invention.

FIG. 3 is a flowchart of Embodiment 2 of a positioning processing method according to the present invention. As shown in FIG. 3, on the basis of Embodiment 1 of the present invention shown in FIG. 2, the positioning the terminal based on a positioning measurement result reported by the terminal in S203 may specifically include:

S301. Provide, for the terminal, a designated positioning signal measurement resource as auxiliary data for positioning measurement, where the auxiliary data includes at least sending timing and/or a sending frequency.

For example, in an LTE network, the positioning server may provide the auxiliary data for positioning measurement for the terminal by using LTE positioning protocol signaling, where the auxiliary data includes sending timing and/or a sending frequency of a positioning signal, and/or the like.

S302. Receive a time difference that is obtained by the terminal by means of measurement based on the auxiliary data and is of arrivals, at the terminal, of positioning signals from different positioning base stations.

Specifically, the positioning server designates, according to the coexistence interference information, a suitable positioning signal measurement resource for the terminal to perform positioning measurement, and notifies the suitable positioning signal measurement resource to the terminal by using the auxiliary data; and the terminal receives, according to an instruction of the auxiliary data, PRSs sent by positioning base stations, records time points at which the PRSs sent by the positioning base stations are received, to obtain a time difference of arrivals, at the terminal, of the PRSs sent by the positioning base stations, and reports the time difference to the positioning server.

S303. Perform calculation according to the time difference to obtain a difference of distances between the terminal and the different positioning base stations, and determine a location of the terminal according to the difference of the distances.

The positioning server may obtain, by means of calculation, the difference of distances between the terminal and the different positioning base stations according to velocities of the PRSs and the time difference of the arrivals, at the terminal, of the PRSs sent by the positioning base stations; and determine the location of the terminal. Increasing a quantity of positioning base stations can further improve precision of terminal positioning.

In this embodiment, in a process in which OTDOA positioning is performed on a user terminal, a positioning server provides a designated positioning signal measurement resource that includes sending timing and/or a sending frequency and is used as auxiliary data for positioning measurement for the user terminal, which reduces impact of an interference signal on a positioning signal and improves precision of terminal positioning.

In the positioning processing method described above, the acquiring coexistence interference information of a terminal may specifically include: receiving the coexistence interference information actively reported by the terminal. Specifically, in a process of actively reporting the coexistence interference information by the terminal, the coexistence interference information may be directly reported to the positioning server, or may be forwarded by a base station, or an MME and an OAM to the positioning server.

In the positioning processing method described above, the acquiring coexistence interference information of a terminal may specifically include:

when a positioning measurement request is acquired, sending, to the terminal, a request for reporting the coexistence interference information, where for example, in an LTE network, when receiving a positioning measurement task for a user terminal, the positioning server may actively send, to the user terminal by using LTE positioning protocol signaling, a request message for reporting coexistence interference information of the terminal; and receiving the coexistence interference information directly reported by the terminal, or forwarded by a base station, or forwarded by an MME and an OAM.

The coexistence interference information received by the positioning server may be coexistence interference information of a single UE, or may be coexistence interference information of multiple UEs. For example, in an LIE network, the terminal may directly send its own coexistence interference information to the positioning server by using LTE positioning protocol signaling; or the terminal may send its own coexistence interference information to a base station by using RRC (Radio Resource Control) signaling, and the base station actively reports the coexistence interference information of the terminal to the positioning server by using LTE positioning protocol A signaling, or after the positioning server sends, to the base station by using LTE positioning protocol A signaling, a request message for reporting the coexistence interference information of the terminal, the base station sends the coexistence interference information of the terminal to the positioning server by using the LTE positioning protocol A signaling; and after the terminal sends its own coexistence interference information to the base station by using the RRC signaling, the base station may further send the coexistence interference information of the terminal to an MME (Mobility Management Entity), the MME forwards the coexistence interference information of the terminal to an OAM (Operations, Administration and Maintenance, operations, administration and maintenance) entity, and the OAM sends the collected coexistence interference information of the terminal to the positioning server; then the positioning server may designate, according to the coexistence interference information of the terminal, a suitable positioning signal measurement resource for the terminal to perform positioning measurement, and position the terminal according to a positioning measurement result reported by the terminal.

In this embodiment, a positioning server sends, to a user terminal, a request message for reporting coexistence interference information of the terminal, or a terminal actively sends its own coexistence interference information to a positioning server, so that in a process in which OTDOA positioning is performed on the user terminal, the positioning server can acquire the coexistence interference information of the terminal in time, which reduces impact of an interference signal on a positioning reference signal, and improves precision of terminal positioning.

In the positioning processing method described above, the acquiring coexistence interference information of a terminal includes: receiving the coexistence interference information of the terminal that is provided by a base station, an MME or an OAM. Specifically, the coexistence interference information of the terminal that is provided by the base station, the MME or the OAM may be actively reported by the terminal, may be reported by the terminal as requested by the base station, the MME or the OAM, or may be learned by the base station, the MME or the OAM in another manner.

In the positioning processing method described above, the acquiring coexistence interference information of a terminal includes: sending, to a base station, an MME and an OAM, a request for reporting the coexistence interference information of the terminal, and receiving the coexistence interference information sent by the base station, or forwarded by the MME and the OAM. Specifically, the positioning server may send, to the base station, the MME and the OAM, a request message for reporting the coexistence interference information of the terminal; and after receiving the foregoing request message of the positioning server, the base station may directly send the coexistence interference information of the terminal to the positioning server, or may forward, by using the MME and the OAM, the coexistence interference information of the terminal to the positioning server.

In the positioning processing method described above, the acquiring coexistence interference information of a terminal includes: receiving coexistence interference information of a single terminal or multiple terminals that is provided by a base station, an MME or an OAM. Specifically, the coexistence interference information received by the positioning server may be coexistence interference information of a single UE, or may be coexistence interference information of multiple UEs.

In the positioning processing method described above, the receiving coexistence interference information provided by a base station may specifically include:

receiving signaling that carries the coexistence interference information and is sent by the base station, where the signaling includes information about a carrier list unsuitable or suitable when coexistence interference exists in the terminal, and/or information about a time domain resource unsuitable or suitable when coexistence interference exists in the terminal, and/or information about a code domain resource unsuitable or suitable when coexistence interference exists in the terminal; and using the included information as the coexistence interference information.

For example, in an LTE network, the base station sends the coexistence interference information of the terminal to the positioning server by using LTE positioning protocol A signaling. Table 1 is an exemplary table of LTE positioning protocol A signaling that carries the coexistence interference information of the terminal. For content of the signaling sent by the base station to the positioning server, reference may be made to Table 1.

TABLE 1

Exemplary table of LTE positioning protocol A signaling that carries the coexistence interference information of the terminal

| IE/Group Name | Range |
|---|---|
| Message Type | |
| LPPa Transaction ID | |
| OTDOA UEs IDC indication | 1.<maxUEineNB> |
| > In Device Coexistence Indication | |
| > . . . | |

As shown in Table 1, Message Type indicates an information type; maxUEineNB indicates a maximum quantity of terminals served by the base station; OTDOA UEs IDC indication indicates an IDC information list of the terminal when OTDOA positioning is performed on the terminal, where a maximum quantity of elements in the list cannot exceed the maximum quantity of terminals served by the base station; and In Device Coexistence Indication indicates an element in the IDC information list of the terminal when OTDOA positioning is performed on the terminal. Table 2 is an exemplary table of an IDC information element of the terminal.

TABLE 2

Exemplary table of an IDC information element of the terminal
IE/Group Name

| >CHOICE In Device Coexistence Indication Item |
| >>AffectedCarrierFreqList |
| >>TDM-AssistanceInfo |
| >> . . . |

As shown in Table 2, content of an element in the IDC information list of the terminal includes: AffectedCarrierFreqList (list of affected carriers), and TDM-AssistanceInfo (time division multiplexing assistance information). A cell radio network temporary identifier is an identifier indicating that the terminal is in a network; the list of affected carriers is a list of carriers on which the terminal is affected by DC; and time division multiplexing assistance information indicates available time domain resource information. An example of detailed signaling implementation is as follows:

InDeviceCoexIndication-r11-IEs ::= SEQUENCE {
affectedCarrierFreqList-r11    AffectedCarrierFreqList-r11  OPTIONAL,
tdm-AssistanceInfo-r11         TDM-AssistanceInfo-r11       OPTIONAL,
}

InDeviceCoexIndication-r11-IEs indicates an information element indicated by DC; IE indicates an information element, an information element; r11 indicates that it is signaling or a feature introduced by the protocol Release 11, which may also be r12 or others herein. Coexistence interference information of a UE sent by a base station to a positioning server by using LTE positioning protocol A signaling may be coexistence interference information of a single UE, or may be coexistence interference information of multiple UEs.

A list of carriers affected by IDC AffectedCarrierFreqList-r11 is a sequence and therefore includes multiple elements. A single element is AffectedCarrierFreq-r11, and a single carrier affected by IDC is expressed as AffectedCarrierFreq-r11; and maxFreqIDC-r11 indicates a maximum quantity of carriers affected by IDC, and a maximum length of the list of carriers affected by IDC is maxFreqIDC-r11. AffectedCarrierFreq-r11 includes but is not limited to a carrier serial number carrierFreq-r11 and an IDC interference direction interferenceDirection-r11. If only an E-UTRA (Evolved Universal Terrestrial Radio Access) system is an affected system of IDC interference, interferenceDirection-r11 is set to eutra; if only other wireless systems are affected systems of IDC interference, interferenceDirection-r11 is set to other; if both E-UTRA and other wireless systems are affected systems of IDC interference, interferenceDirection-r11 is set to both; and spare indicates a reserve signaling location. r11 in a signaling name indicates that it is signaling or a feature introduced by the protocol release Release11, which may also be r12 or others herein. An example of a specific signaling form is as follows:

```
AffectedCarrierFreqList-r11 ::= SEQUENCE (SIZE
    (1..maxFreqIDC-r11))
OF AffectedCarrierFreq-r11
    AffectedCarrierFreq-r11 ::=SEQUENCE {
    carrierFreq-r11              CarrierFreq-r11,
    interferenceDirection-r11    ENUMERATED {eutra, other, both,
                                 spare}
    }
```

Time division multiplexing assistance information TDM-AssistanceInfo-r11 represents an available time resource or a feasible time domain data transmission manner; and content in TDM-AssistanceInfo-r11 includes but is not limited to discontinuous reception assistant information drx-AssistanceInfo-r11 (DRX: Discontinuous Reception, discontinuous reception) and an IDC subframe pattern list idc-SubframePatternList-r11.

drx-AssistanceInfo-r11 includes a DRX cycle length drx-CycleLength-r11, a DRX offset drx-Offset-r11, and a DRX active time length drx-ActiveTime-r11. A value of drx-CycleLength-r11 ranges from 40 subframes to 256 subframes; sf40 represents subframe 40, that is, a length of 40 subframes, which equals to 40 milliseconds; and a value of drx-Offset-r11 is a value from integers 0 to 255.

idc-SubframePatternList-r11 indicates an IDC subframe pattern list, representing a subframe pattern that can be used for data transmission or cannot be used for data transmission. For example, a current interference direction is that E-UTRA is interfered by ISM frequency band, and a terminal is clear about a time point of ISM interference; therefore, a network may be notified of an IDC subframe pattern, for example, "000100 . . . ", which indicates that the first three subframes cannot be used to transmit E-UTRA data, the fourth subframe can be used to transmit the E-UTRA data, and the fifth and the sixth subframes cannot be used to transmit the E-UTRA data. This subframe pattern is a binary bit stream, where 0 indicates that data of an interfered system cannot be transmitted or measurement cannot be performed on an interfered system, and 1 indicates that data of the interfered system can be transmitted or measurement can be performed on the interfered system. r11 in a signaling name indicates that it is signaling or a feature introduced by the protocol release Release11, which may also be r12 or others herein. An example of specific signaling is as follows:

```
TDM-AssistanceInfo-r11 ::=   CHOICE {
    drx-AssistanceInfo-r11  SEQUENCE {
    drx-CycleLength-r11     ENUMERATED {sf40, sf64, sf80,
                            sf128, sf160,
sf256, spare2, spare1},
    drx-Offset-r11          INTEGER (0..255)   OPTIONAL,
    drx-ActiveTime-r11      ENUMERATED {sf20, sf30, sf40,
                            sf60, sf80,
    sf100, spare2, spare1}
    },
    idc-SubframePatternList-r11    IDC-SubframePatternList-r11,
    ...
    }
```

In this embodiment, in a process in which OTDOA positioning is performed on a user terminal, a positioning server receives coexistence interference information of the terminal that includes information about a list of affected carriers and information about an available time domain resource, and is sent by using LTE positioning protocol A signaling by a base station, so that the positioning server can designate a suitable frequency domain resource and time domain resource for the terminal to perform positioning measurement, which reduces impact of an interference signal on a positioning reference signal, and improves precision of terminal positioning.

Figure 4:
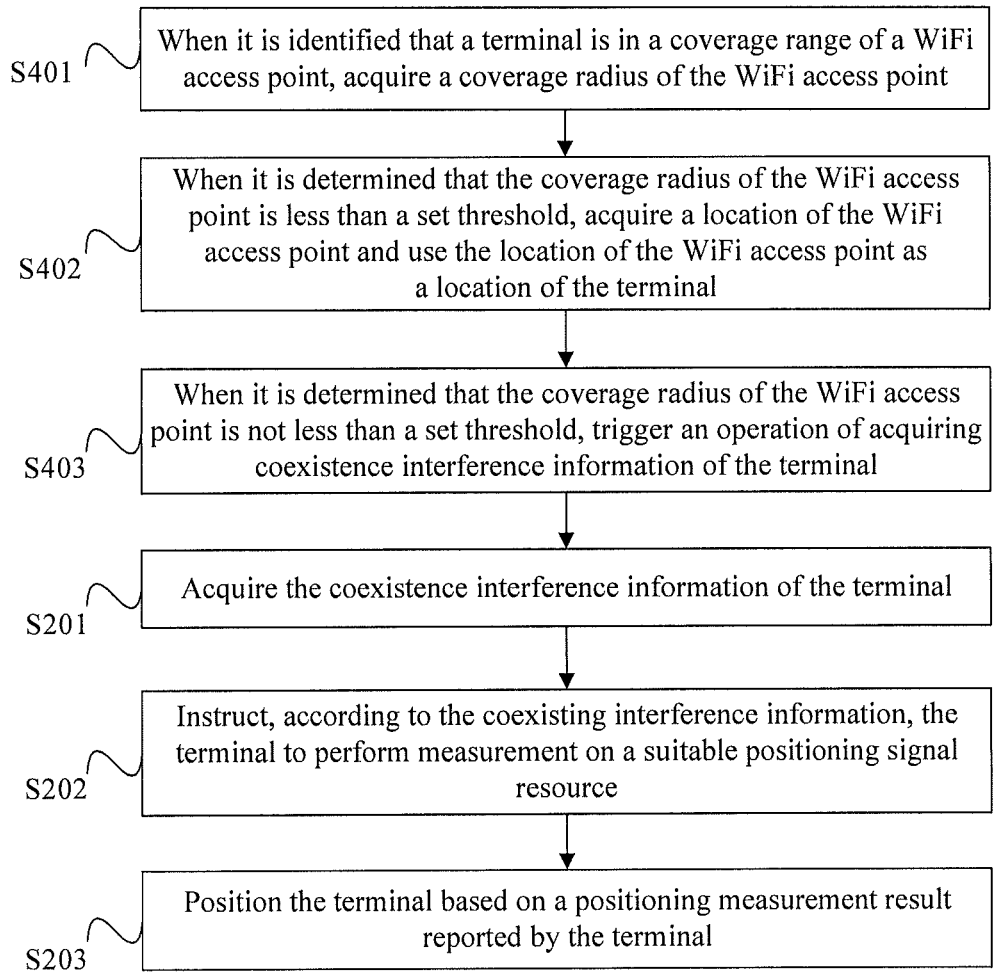
FIG. 4 is a flowchart of Embodiment 3 of a positioning processing method according to the present invention.

FIG. 4 is a flowchart of Embodiment 3 of a positioning processing method according to the present invention. As shown in FIG. 4, on the basis of Embodiment 1 of the present invention shown in FIG. 2, and before the acquiring coexistence interference information of a terminal in S201, the method in this embodiment may further include:

S401. When it is identified that the terminal is in a coverage range of a WiFi access point, acquire a coverage radius of the WiFi access point.

When identifying that a user terminal accesses a WiFi access point, the positioning server further acquires a coverage range of the WiFi access point that the user terminal accesses.

S402. When it is determined that the coverage radius of the WiFi access point is less than a set threshold, acquire a location of the WiFi access point and use the location of the WiFi access point as a location of the terminal.

When the coverage range of the WiFi access point that the user terminal accesses is relatively small, the positioning server further positions a specific location of the WiFi access point, and uses the location of the WiFi access point as the location of the terminal.

S403. When it is determined that the coverage radius of the WiFi access point is not less than a set threshold, trigger the operation of acquiring the coexistence interference information of the terminal.

When the coverage range of the WiFi access point that the user terminal accesses is too large, the location of the user terminal may be far from the location of the WiFi access point that the user terminal accesses; therefore, by using the positioning processing method described above, the positioning server may acquire the coexistence interference information of the terminal and position the user terminal in an OTDOA positioning manner.

In this embodiment, when a user terminal accesses a WiFi access point and a coverage range of the WiFi access point is relatively small, a positioning server positions the WiFi access point and uses a location of the WiFi access point as a location of the terminal, which improves efficiency of terminal positioning; in addition, when the coverage range of the WiFi access point that the user terminal accesses is too large, the positioning server triggers an operation of acquiring coexistence interference information of the terminal, and positions the user terminal in an OTDOA positioning manner, which ensures precision of terminal positioning.

In the positioning processing method described above, the acquiring a location of the WiFi access point may specifically include:

acquiring, from the terminal, the location of the WiFi access point, where the positioning server may acquire the location of the WiFi access point by sending, to the terminal, a request message for reporting location information of the WiFi access point that the terminal accesses, or the terminal may actively send, to the positioning server, location information of the WiFi access point that the terminal accesses;

sending a location acquiring request to the WiFi access point and receiving the location returned by the WiFi access point, where the positioning server may actively send, to the WiFi access point, a request message for reporting location information, and after receiving the foregoing request message sent by the positioning server, the WiFi access point sends its own location information to the positioning server; and querying a local database to acquire the location of the WiFi access point.

The positioning server may further query the local database to acquire the location of the WiFi access point, and the location information of the WiFi access point that is stored in the local database may be: location information of the WiFi access point that is acquired by the positioning server by sending, to the terminal, the request message for reporting the location information of the WiFi access point that the terminal accesses; location information of the WiFi access point that is actively reported by the terminal and received by the positioning server; and location information that is returned by the WiFi access point and is received by the positioning server by sending the location acquiring request message to the WiFi access point.

In this embodiment, a positioning server acquires, in different manners, location information of a WiFi access point that a terminal accesses, and when a coverage range of the WiFi access point that the terminal accesses is relatively small, determines a location of the WiFi access point as a location of the terminal. Therefore, the location of the terminal may be rapidly determined, which improves efficiency of terminal positioning.

Figure 5:
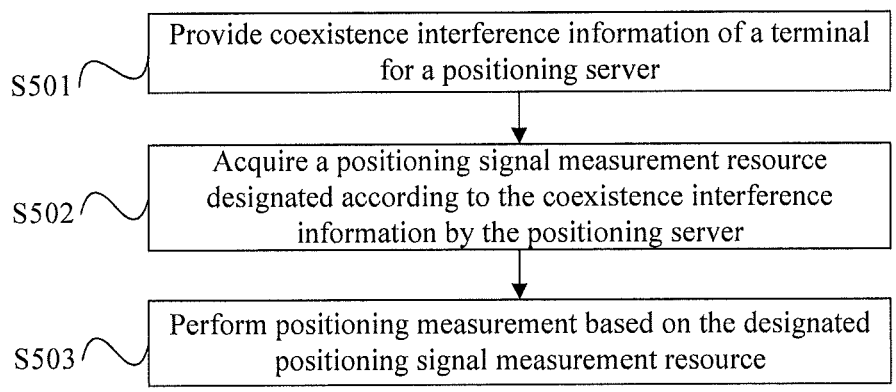
FIG. 5 is a flowchart of Embodiment 4 of a positioning processing method according to the present invention.

FIG. 5 is a flowchart of Embodiment 4 of a positioning processing method according to the present invention. As shown in FIG. 5, the method in this embodiment may include:

S501. Provide coexistence interference information of a terminal for a positioning server.

When the terminal is interfered by an interference signal that severely affects positioning reference signal transmission, the terminal provides the coexistence interference information for the positioning server, where the coexistence interference information may be information about a frequency domain resource, time domain resource, and/or code domain resource on which the terminal is severely interfered by IDC, or information about a frequency domain resource, time domain resource, and/or code domain resource on which the terminal is not severely interfered by IDC.

S502. Acquire a positioning signal measurement resource designated according to the coexistence interference information by the positioning server.

After acquiring the coexistence interference information of the terminal, the positioning server designates, for the terminal according to the coexistence interference information, a suitable positioning signal resource as a measurement resource, and sends the measurement resource to the terminal.

S503. Perform positioning measurement based on the designated positioning signal measurement resource.

The terminal receives, based on the positioning signal measurement resource designated by the positioning server, PRSs sent by positioning base stations, records time points at which the PRSs sent by the positioning base stations are received, to obtain a time difference of arrivals, at the terminal, of the PRSs sent by the positioning base stations, and reports the time difference to the positioning server; and the positioning server may further obtain, by means of calculation, a difference of distances between the terminal and the different positioning base stations according to velocities of the PRSs and the time difference of the arrivals, at the terminal, of the PRSs sent by the positioning base stations, so that the terminal can be positioned in an OTDOA positioning manner.

In this embodiment, in a process in which OTDOA positioning is performed on a user terminal, coexistence interference information of the terminal is provided for a positioning server, so that the positioning server can designate, according to the coexistence interference information of the terminal, a positioning signal measurement resource for the terminal to perform measurement, which reduces impact of an interference signal on a positioning signal, and improves precision of terminal positioning.

In the positioning processing method described above, the providing coexistence interference information of a terminal for a positioning server may specifically include:

when a request, which is sent by the positioning server, for reporting the coexistence interference information is received, or the terminal determines that the coexistence interference information needs to be reported, directly reporting, or forwarding by using a base station, or forwarding by using an MME and an OAM, the coexistence interference information of the terminal to the positioning server.

For example, in an LTE network, when receiving a positioning measurement task for a user terminal, the positioning server may actively send, to the user terminal by using LTE positioning protocol signaling, a request message for reporting coexistence interference information of the terminal, and after receiving the foregoing request message, the terminal may send its own coexistence interference information to the positioning server by using the LTE positioning protocol signaling; or the terminal may monitor a signal interference environment in which the terminal is located, and when it is detected that the signal interference environment in which the terminal is located changes, the terminal directly reports the coexistence interference information to the positioning server, or the terminal sends the coexistence interference information to a base station, and then the coexistence interference information is forwarded by the base station, or forwarded by an MME and an OAM to the positioning server.

In this embodiment, a terminal provides its own coexistence interference information for a positioning server in time, so that in a process in which OTDOA positioning is performed on the terminal, the positioning server can acquire the coexistence interference information of the terminal in time, and designate a suitable resource for the terminal to perform measurement, which reduces impact of an interference signal on a positioning reference signal, and improves precision of terminal positioning.

Figure 6:
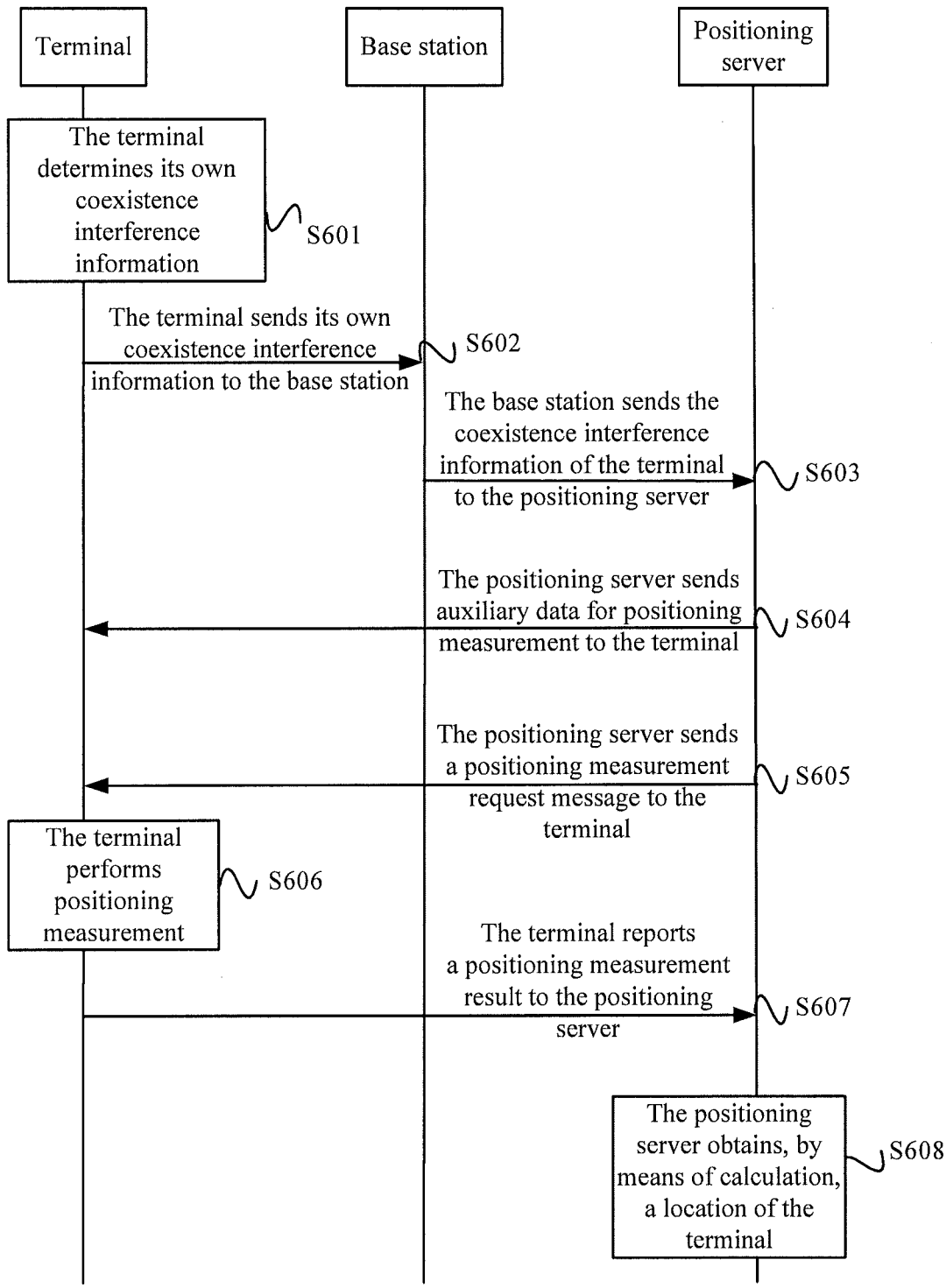
FIG. 6 is a flowchart of Embodiment 5 of a positioning processing method according to the present invention.

FIG. 6 is a flowchart of Embodiment 5 of a positioning processing method according to the present invention. As shown in FIG. 6, the method in this embodiment may include:

S601. A terminal determines its own coexistence interference information.

Specifically, the terminal may determine its own coexistence interference information by monitoring an interference signal in an environment in which the terminal is located. For example, in an LTE network, the terminal determines, according to a situation of IDC interference with the terminal, a frequency domain resource, time domain resource, and code domain resource on which the terminal is interfered by IDC or the terminal is severely interfered by IDC as information about a frequency domain resource, time domain resource, and code domain resource unsuitable for the terminal; and determines a frequency domain resource, time domain resource, and code domain resource on which the terminal is not interfered by IDC or the terminal is not severely interfered by IDC as information about a frequency domain resource, time domain resource, and code domain resource suitable for the terminal.

S602. The terminal sends its own coexistence interference information to a base station.

The terminal sends its own coexistence interference information to the base station by using RRC signaling.

S603. The base station sends the coexistence interference information of the terminal to a positioning server.

For example, in an LTE network, the base station sends the coexistence interference information of the terminal to the positioning server by using LTE positioning protocol A signaling.

S604. The positioning server sends auxiliary data for positioning measurement to the terminal.

For example, in an LTE network, the positioning server sends the auxiliary data for positioning measurement to the terminal by using LTE positioning protocol signaling, where the auxiliary data for positioning measurement includes sending timing and/or a sending frequency of a positioning signal, and/or the like.

S605. The positioning server sends a positioning measurement request message to the terminal.

For example, in an LTE network, when receiving a positioning measurement task for a user terminal, the positioning server may send the positioning measurement request message to the terminal by using LTE positioning protocol signaling, to request the terminal to perform positioning measurement.

S606. The terminal performs positioning measurement.

According to the received positioning measurement request and with reference to the auxiliary data provided by the positioning server, the terminal receives positioning reference signals and records time points at which the positioning reference signals sent by positioning base stations are received, to obtain a time difference of arrivals, at the terminal, of the positioning reference signals of the positioning base stations.

S607. The terminal reports a positioning measurement result to the positioning server.

For example, in an LTE network, the terminal reports, to the positioning server by using LTE positioning protocol signaling, the time difference of the arrivals, at the terminal, of the positioning reference signals of the positioning base stations.

S608. The positioning server obtains, by means of calculation, a location of the terminal.

The positioning server maps the time difference that is reported by the terminal and is of the arrivals, at the terminal, of the positioning reference signals of the positioning base stations to a difference of distances between the terminal and the different base stations; and then further geographically positions the terminal by means of mathematical calculation.

In this embodiment, in a process in which OTDOA positioning is performed on a user terminal, the terminal actively reports its own coexistence interference information to a positioning server, so that the positioning server can designate, according to the coexistence interference information of the terminal, a suitable positioning signal measurement resource for the terminal to perform positioning measurement, which reduces impact of an interference signal on a positioning signal, and improves precision of terminal positioning.

Figure 7:
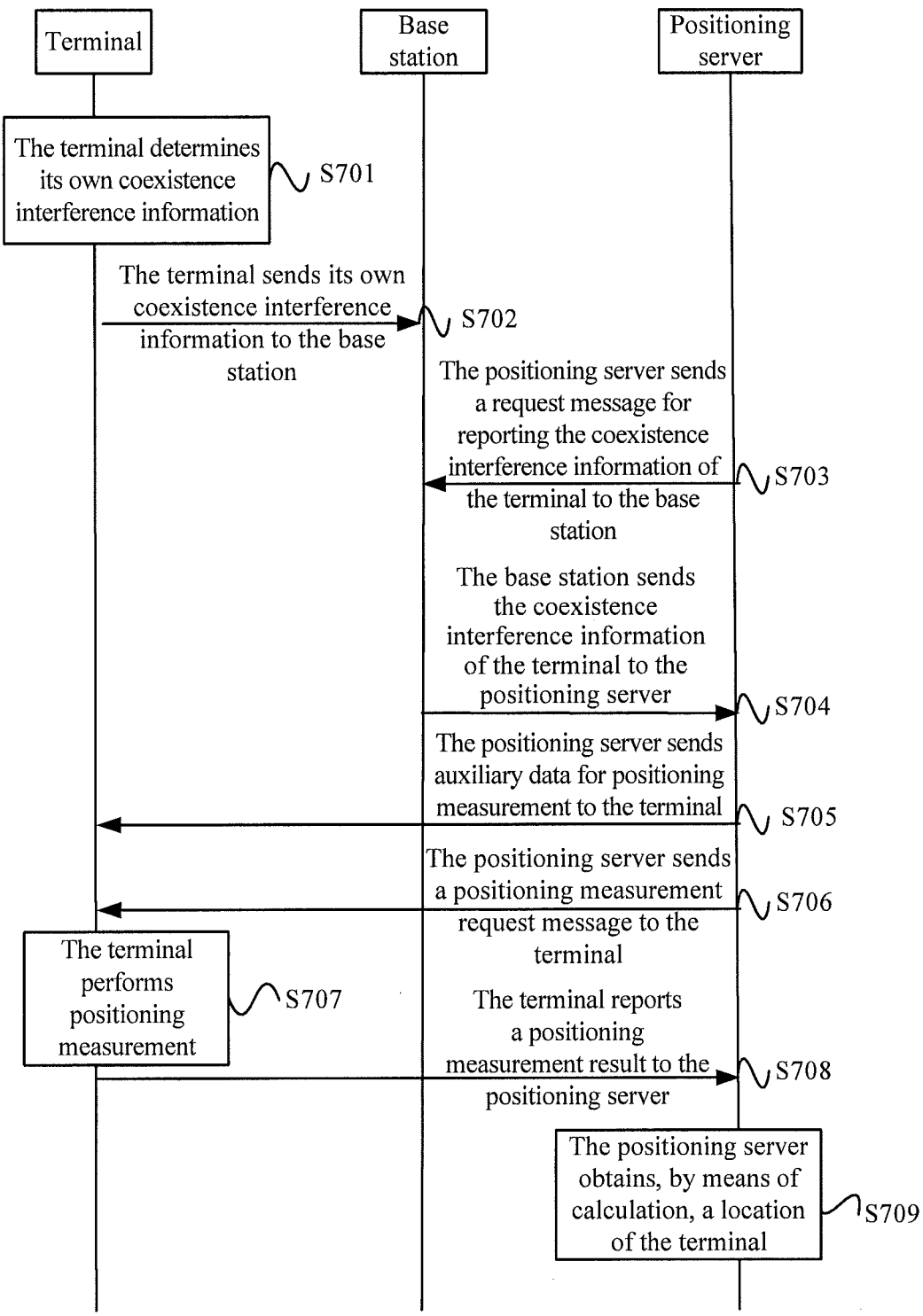
FIG. 7 is a flowchart of Embodiment 6 of a positioning processing method according to the present invention.

FIG. 7 is a flowchart of Embodiment 6 of a positioning processing method according to the present invention. As shown in FIG. 7, the method in this embodiment may include:

S701. A terminal determines its own coexistence interference information.

Specifically, the terminal may determine its own coexistence interference information by monitoring an interference signal in an environment in which the terminal is located. For example, in an LTE network, the terminal determines, according to a situation of IDC interference with the terminal, a frequency domain resource, time domain resource, and code domain resource on which the terminal is interfered by IDC or the terminal is severely interfered by IDC as information about a frequency domain resource, time domain resource, and code domain resource unsuitable for the terminal; and determines a frequency domain resource, time domain resource, and code domain resource on which the terminal is not interfered by IDC or the terminal is not severely interfered by IDC as information about a frequency domain resource, time domain resource, and code domain resource suitable for the terminal.

S702. The terminal sends its own coexistence interference information to a base station.

The terminal may send its own coexistence interference information to the base station by using RRC signaling.

S703. A positioning server sends, to the base station, a request message for reporting the coexistence interference information of the target terminal.

For example, in an LTE network, when receiving a positioning measurement task for the target terminal, the positioning server may send, to a serving base station of the target terminal by using LIE positioning protocol signaling A, the request message for reporting the coexistence interference information of the target terminal.

S704. The base station sends the coexistence interference information of the terminal to the positioning server.

For example, in an LTE network, the base station sends the coexistence interference information of the terminal to the positioning server by using LTE positioning protocol A signaling.

S705. The positioning server sends auxiliary data for positioning measurement to the terminal.

For example, in an LTE network, the positioning server sends the auxiliary data for positioning measurement to the terminal by using LTE positioning protocol signaling, where the auxiliary data for positioning measurement includes sending timing and/or a sending frequency of a positioning signal, and/or the like.

S706. The positioning server sends a positioning measurement request message to the terminal.

For example, in an LTE network, when receiving a positioning measurement task for a user terminal, the positioning server may send the positioning measurement request message to the terminal by using LTE positioning protocol signaling, to request the terminal to perform positioning measurement.

S707. The terminal performs positioning measurement.

According to the received positioning measurement request and with reference to the auxiliary data provided by the positioning server, the terminal receives positioning reference signals and records time points at which the positioning reference signals sent by positioning base stations are received, to obtain a time difference of arrivals, at the terminal, of the positioning reference signals of the positioning base stations.

S708. The terminal reports a positioning measurement result to the positioning server.

For example, in an LTE network, the terminal reports, to the positioning server by using LTE positioning protocol signaling, the time difference of the arrivals, at the terminal, of the positioning reference signals of the positioning base stations.

S709. The positioning server obtains, by means of calculation, a location of the terminal.

The positioning server maps the time difference that is reported by the terminal and is of the arrivals, at the terminal, of the positioning reference signals of the positioning base stations to a difference of distances between the terminal and the different base stations; and then further geographically positions the terminal by means of mathematical calculation.

In this embodiment, in a process in which OTDOA positioning is performed on a user terminal, when receiving a positioning measurement task for a target terminal, a positioning server actively sends, to a serving base station of the target terminal, a request message for reporting coexistence interference information of the target terminal, and designates a suitable positioning signal measurement resource for the terminal according to the coexistence interference information of the terminal, which reduces impact of an interference signal on a positioning signal, and improves precision of terminal positioning.

Figure 8:
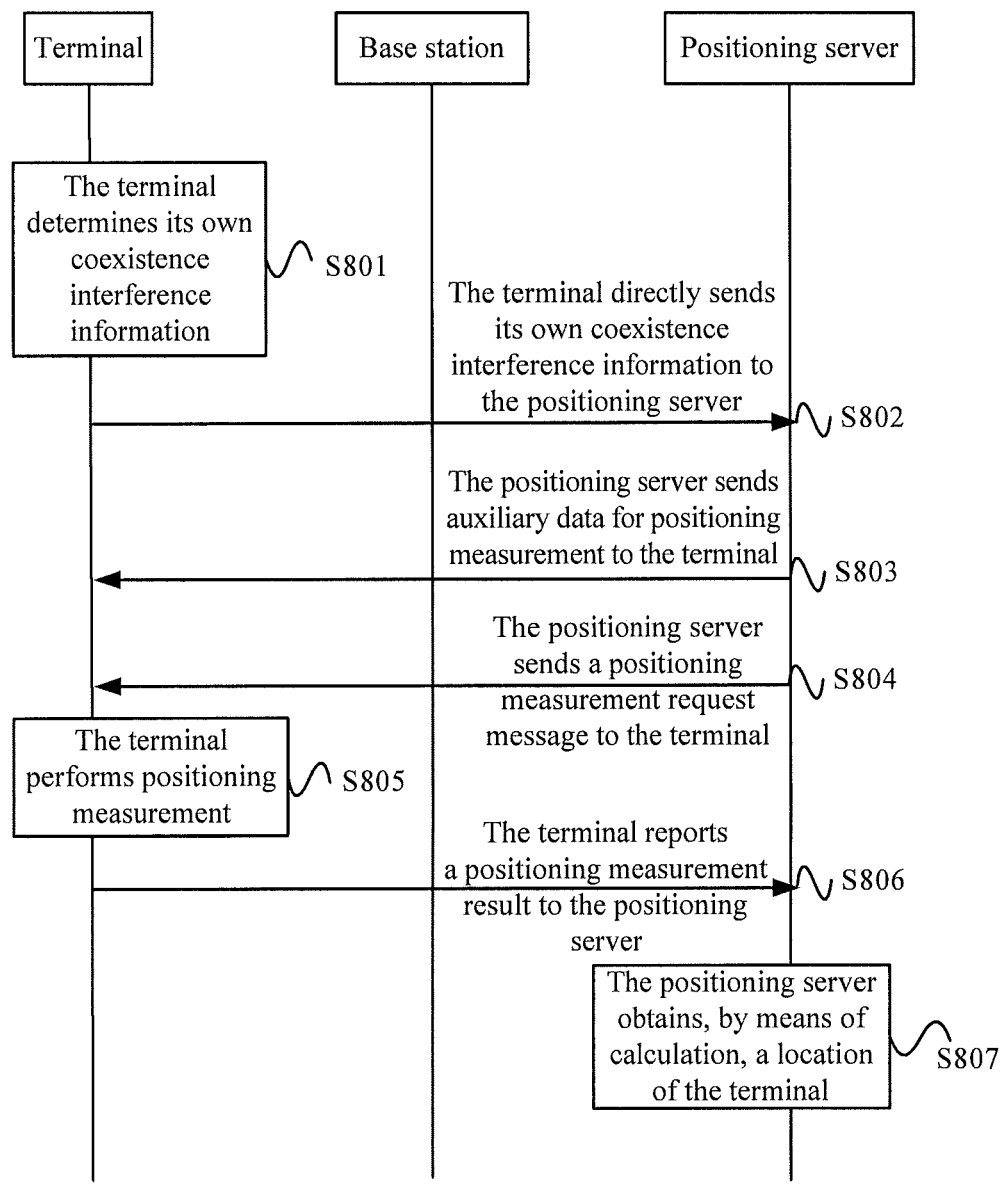
FIG. 8 is a flowchart of Embodiment 7 of a positioning processing method according to the present invention.

FIG. 8 is a flowchart of Embodiment 7 of a positioning processing method according to the present invention. As shown in FIG. 8, the method in this embodiment may include:

S801. A terminal determines its own coexistence interference information.

Specifically, the terminal may determine its own coexistence interference information by monitoring an interference signal in an environment in which the terminal is located. For example, in an LTE network, the terminal determines, according to a situation of IDC interference with the terminal, a frequency domain resource, time domain resource, and code domain resource on which the terminal is interfered by IDC or the terminal is severely interfered by IDC as information about a frequency domain resource, time domain resource, and code domain resource unsuitable for the terminal; and determines a frequency domain resource, time domain resource, and code domain resource on which the terminal is not interfered by IDC or the terminal is not severely interfered by IDC as information about a frequency domain resource, time domain resource, and code domain resource suitable for the terminal.

S802. The terminal directly sends its own coexistence interference information to a positioning server.

For example, in an LTE network, the terminal directly sends its own coexistence interference information to the positioning server by using LTE positioning protocol signaling.

S803. The positioning server sends auxiliary data for positioning measurement to the terminal.

For example, in an LTE network, the positioning server sends the auxiliary data for positioning measurement to the terminal by using LTE positioning protocol signaling, where the auxiliary data for positioning measurement includes sending timing and/or a sending frequency of a positioning signal, and/or the like.

S804. The positioning server sends a positioning measurement request message to the terminal.

For example, in an LTE network, when receiving a positioning measurement task for a user terminal, the positioning server may send the positioning measurement request message to the terminal by using LTE positioning protocol signaling, to request the terminal to perform positioning measurement.

S805. The terminal performs positioning measurement.

According to the received positioning measurement request and with reference to the auxiliary data provided by the positioning server, the terminal receives positioning reference signals and records time points at which the positioning reference signals sent by positioning base stations are received, to obtain a time difference of arrivals, at the terminal, of the positioning reference signals of the positioning base stations.

S806. The terminal reports a positioning measurement result to the positioning server.

For example, in an LTE network, the terminal reports, to the positioning server by using LTE positioning protocol signaling, the time difference of the arrivals, at the terminal, of the positioning reference signals of the positioning base stations.

S807. The positioning server obtains, by means of calculation, a location of the terminal.

The positioning server maps the time difference that is reported by the terminal and is of the arrivals, at the terminal, of the positioning reference signals of the positioning base stations to a difference of distances between the terminal and the different base stations; and then further geographically positions the terminal by means of mathematical calculation.

In this embodiment, in a process in which OTDOA positioning is performed on a user terminal, the terminal directly reports its own coexistence interference information to a positioning server, so that the positioning server can designate, according to the coexistence interference information of the terminal, a suitable positioning signal measurement resource for the terminal to perform measurement, which reduces impact of an interference signal on a positioning signal, and improves precision of terminal positioning.

Figure 9:
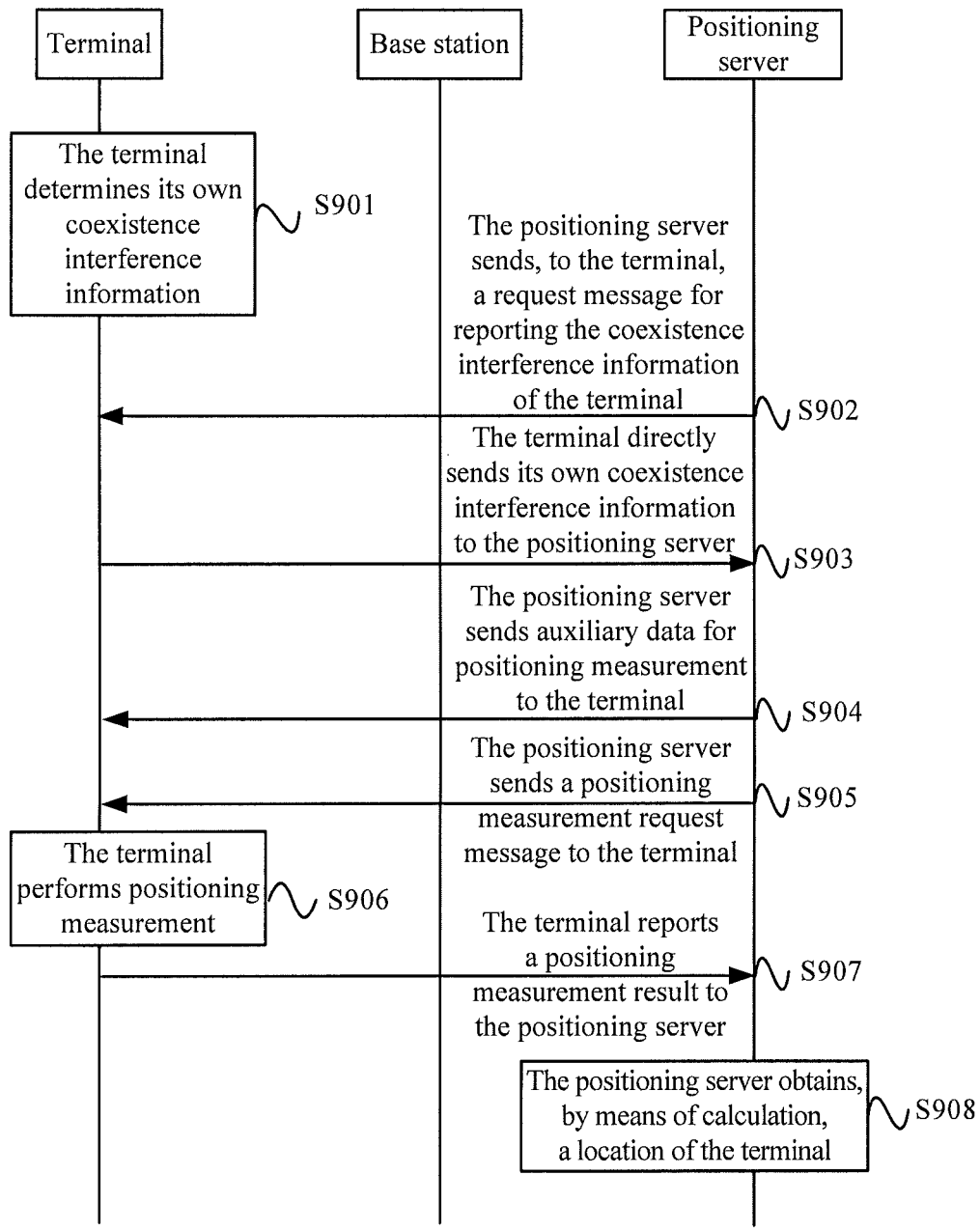
FIG. 9 is a flowchart of Embodiment 8 of a positioning processing method according to the present invention.

FIG. 9 is a flowchart of Embodiment 8 of a positioning processing method according to the present invention. As shown in FIG. 9, the method in this embodiment may include:

S901. A terminal determines its own coexistence interference information.

Specifically, the terminal may determine its own coexistence interference information by monitoring an interference signal in an environment in which the terminal is located. For example, the terminal determines, according to a situation of IDC interference with the terminal, a frequency domain resource, time domain resource, and code domain resource on which the terminal is interfered by IDC or the terminal is severely interfered by IDC as information about a frequency domain resource, time domain resource, and code domain resource unsuitable for the terminal; and determines a frequency domain resource, time domain resource, and code domain resource on which the terminal is not interfered by IDC or the terminal is not severely interfered by IDC as information about a frequency domain resource, time domain resource, and code domain resource suitable for the terminal.

S902. A positioning server sends, to the terminal, a request message for reporting the coexistence interference information of the terminal.

For example, in an LTE network, when receiving a positioning measurement task for a user terminal, the positioning server sends, to the user terminal by using LTE positioning protocol signaling, a request message for reporting the coexistence interference information of the terminal.

S903. The terminal directly sends its own coexistence interference information to the positioning server.

For example, in an LTE network, the terminal directly sends its own coexistence interference information to the positioning server by using LTE positioning protocol signaling.

S904. The positioning server sends auxiliary data for positioning measurement to the terminal.

For example, in an LTE network, the positioning server sends the auxiliary data for positioning measurement to the terminal by using LTE positioning protocol signaling, where the auxiliary data for positioning measurement includes sending timing and/or a sending frequency of a positioning signal, and/or the like.

S905. The positioning server sends a positioning measurement request message to the terminal.

For example, in an LTE network, when receiving a positioning measurement task for the user terminal, the positioning server may send the positioning measurement request message to the terminal by using LTE positioning protocol signaling, to request the terminal to perform positioning measurement.

S906. The terminal performs positioning measurement.

According to the received positioning measurement request and with reference to the auxiliary data provided by the positioning server, the terminal receives positioning reference signals and records time points at which the positioning reference signals sent by positioning base stations are received, to obtain a time difference of arrivals, at the terminal, of the positioning reference signals of the positioning base stations.

S907. The terminal reports a positioning measurement result to the positioning server.

For example, in an LTE network, the terminal reports, to the positioning server by using LTE positioning protocol signaling, the time difference of the arrivals, at the terminal, of the positioning reference signals of the positioning base stations.

S908. The positioning server obtains, by means of calculation, a location of the terminal.

The positioning server maps the time difference that is reported by the terminal and is of the arrivals, at the terminal, of the positioning reference signals of the positioning base stations to a difference of distances between the terminal and the different base stations; and then further geographically positions the terminal by means of mathematical calculation.

In this embodiment, in a process in which OTDOA positioning is performed on a user terminal, a positioning server sends, to the terminal, a request message for reporting coexistence interference information, and after receiving the request message sent by the positioning server, the terminal sends its own coexistence interference information to the positioning server, so that the positioning server can designate, according to the coexistence interference information of the terminal, a suitable positioning signal measurement resource for the terminal to perform positioning measurement, which reduces impact of an interference signal on a positioning signal, and improves precision of terminal positioning.

Figure 10:
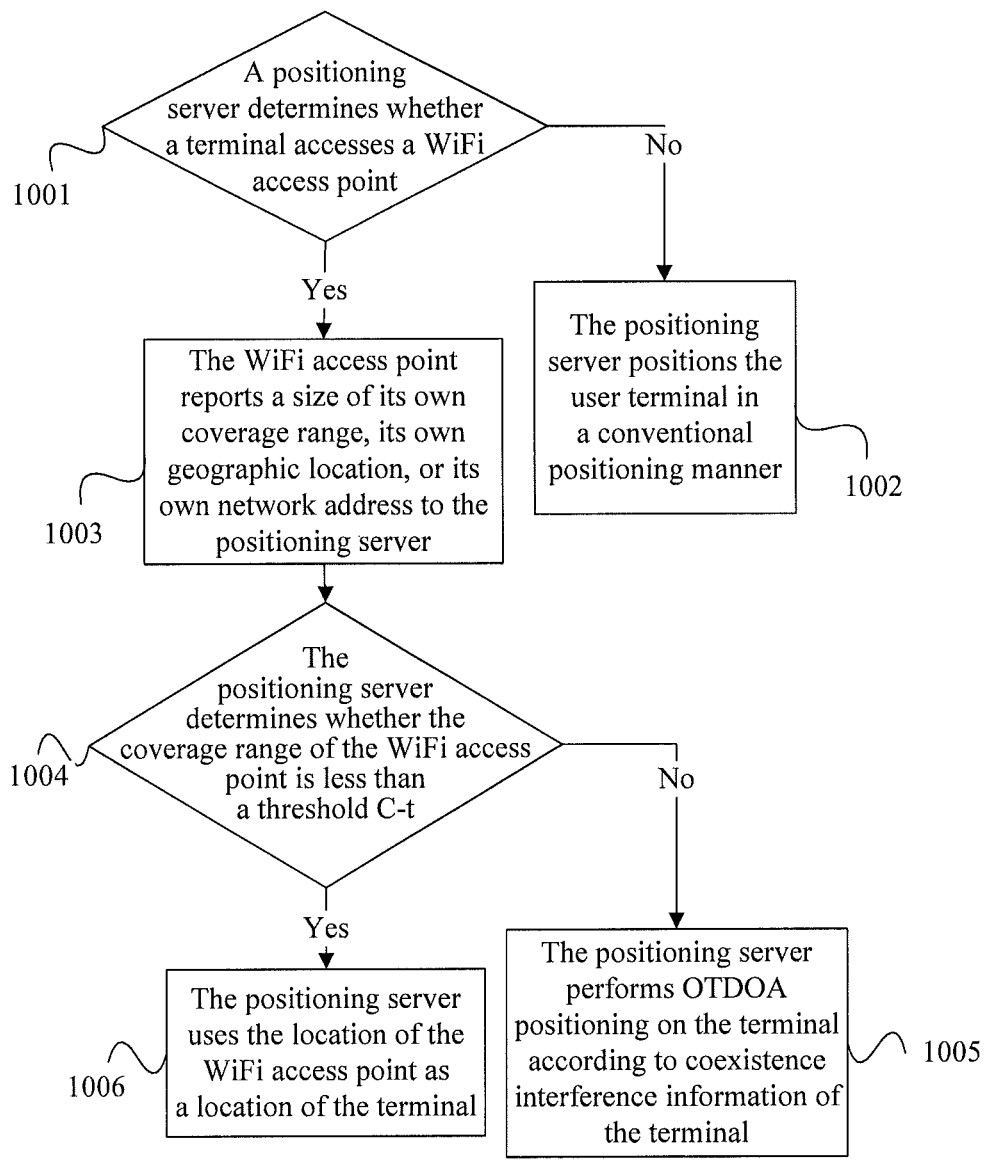
FIG. 10 is a flowchart of Embodiment 9 of a positioning processing method according to the present invention.

FIG. 10 is a flowchart of Embodiment 9 of a positioning processing method according to the present invention. As shown in FIG. 10, the method in this embodiment may include:

S1001. A positioning server determines whether a terminal accesses a WiFi access point.

The positioning server determines whether the terminal accesses the WiFi access point. If the terminal accesses the WiFi access point, perform S1003, and if the terminal does not access the WiFi access point, perform S1002.

S1002. The positioning server positions the user terminal in a conventional positioning manner.

For example, the positioning server may position the user terminal in a conventional OTDOA positioning manner.

S1003. The WiFi access point reports a size of its own coverage range, its own geographic location, or its own network address to the positioning server.

S1004. The positioning server determines whether the coverage range of the WiFi access point is less than a threshold C-t.

The positioning server determines, according to the size of the coverage range reported by the WiFi access point, whether the coverage range of the WiFi access point is less than the threshold C-t. If the coverage range of the WiFi access point is less than the threshold C-t, perform S1006, and if the coverage range of the WiFi access point is not less than the threshold C-t, perform S1005.

S1005. The positioning server performs OTDOA positioning on the terminal according to coexistence interference information of the terminal.

When the coverage range of the WiFi access point that the user terminal accesses is too large, a location of the user terminal may be far from the location of the WiFi access point that the user terminal accesses; therefore, the positioning server may position the user terminal in an OTDOA positioning manner and based on acquired coexistence interference information of the terminal.

S1006. The positioning server uses the location of the WiFi access point as a location of the terminal.

When the coverage range of the WiFi access point that the user terminal accesses is relatively small, the positioning server directly uses the location of the WiFi access point as the location of the terminal.

In this embodiment, when a user terminal accesses a WiFi access point, the WiFi access point reports its own coverage range and its own location coordinates to a positioning server, and when the coverage range of the WiFi access point is relatively small, the positioning server directly uses a location of the WiFi access point as a location of the terminal, which improves efficiency of terminal positioning.

Figure 11:
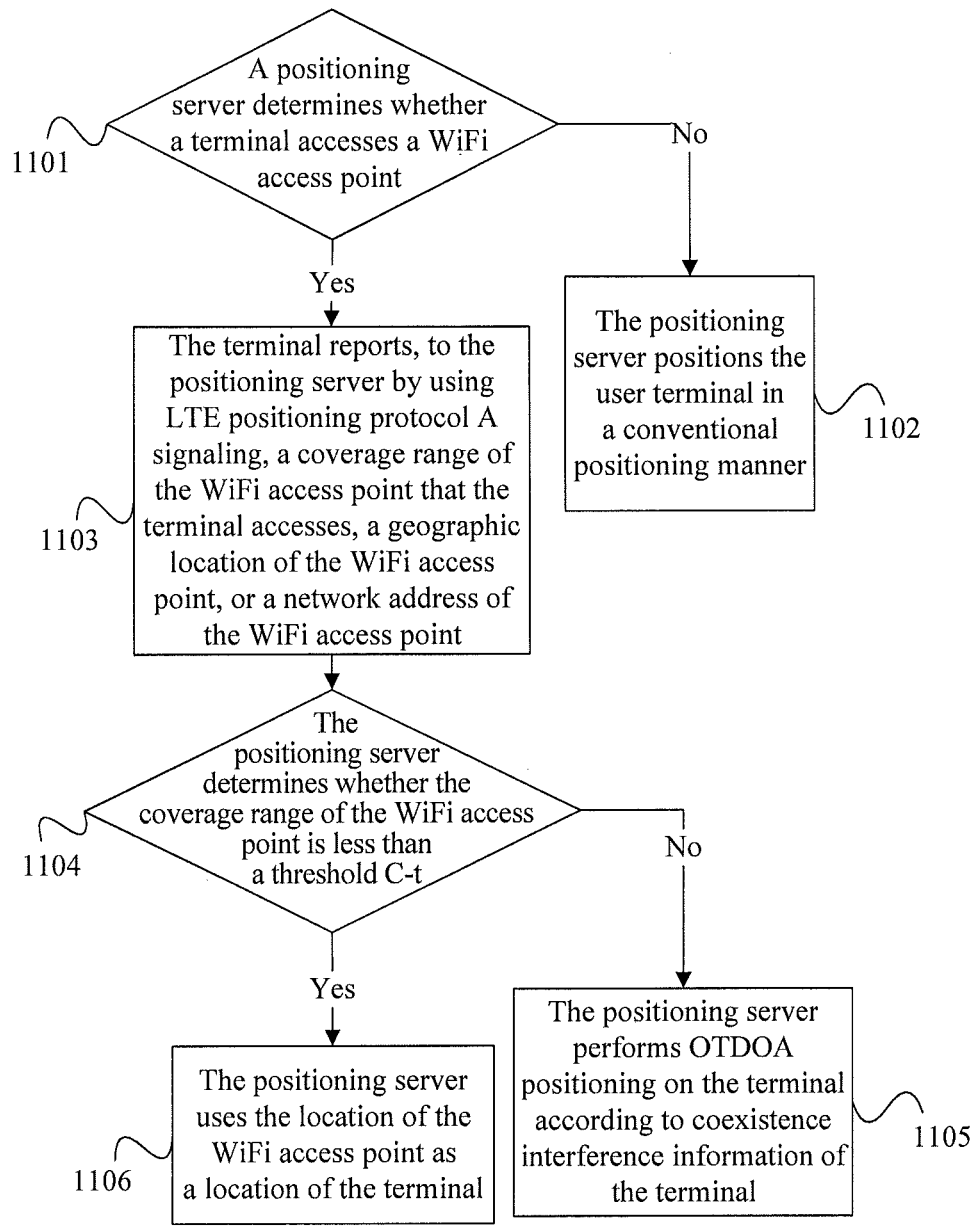
FIG. 11 is a flowchart of Embodiment 10 of a positioning processing method according to the present invention.

FIG. 11 is a flowchart of Embodiment 10 of a positioning processing method according to the present invention. As shown in FIG. 11, the method in this embodiment may include:

S1101. A positioning server determines whether a terminal accesses a WiFi access point.

The positioning server determines whether the terminal accesses the WiFi access point. If the terminal accesses the WiFi access point, perform S1103, and if the terminal does not access the WiFi access point, perform S1102.

S1102. The positioning server positions the user terminal in a conventional positioning manner.

For example, the positioning server may position the user terminal in a conventional OTDOA positioning manner.

S1103. The terminal reports, to the positioning server by using LTE positioning protocol signaling, a coverage range of the WiFi access point that the terminal accesses, a geographic location of the WiFi access point, or a network address of the WiFi access point.

S1104. The positioning server determines whether the coverage range of the WiFi access point is less than a threshold C-t.

The positioning server determines, according to the coverage range of the WiFi access point reported by the user terminal, whether the coverage range of the WiFi access point is less than the threshold C-t. If the coverage range of the WiFi access point is less than the threshold C-t, perform S1106, and if the coverage range of the WiFi access point is not less than the threshold C-t, perform S1105.

S1105. The positioning server performs OTDOA positioning on the terminal according to coexistence interference information of the terminal.

When the coverage range of the WiFi access point that the user terminal accesses is too large, a location of the user terminal may be far from the location of the WiFi access point that the user terminal accesses; therefore, the positioning server may position the user terminal in an OTDOA positioning manner and based on acquired coexistence interference information of the terminal.

S1106. The positioning server uses the location of the WiFi access point as a location of the terminal.

When the coverage range of the WiFi access point that the user terminal accesses is relatively small, the positioning server directly uses the location of the WiFi access point as the location of the terminal.

In this embodiment, when a user terminal accesses a WiFi access point, the terminal reports, to a positioning server, a coverage range of the WiFi access point that the terminal accesses, a geographic location of the WiFi access point, or a network address of the WiFi access point, and when the coverage range of the WiFi access point is relatively small, the positioning server directly uses the location of the WiFi access point as a location of the terminal, which improves efficiency of terminal positioning.

Figure 12:
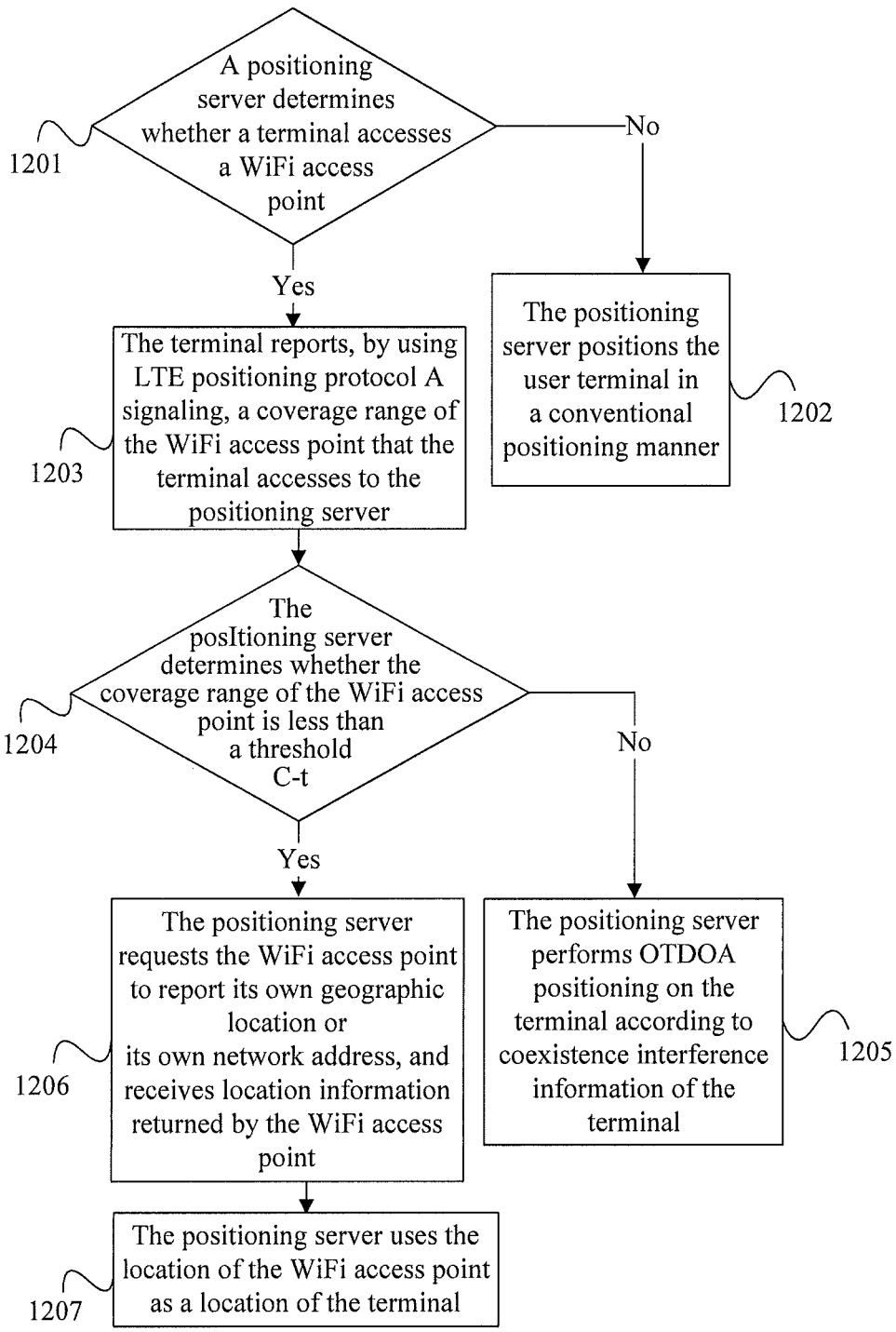
FIG. 12 is a flowchart of Embodiment 11 of a positioning processing method according to the present invention.

FIG. 12 is a flowchart of Embodiment 11 of a positioning processing method according to the present invention. The method in this embodiment may include:

S1201. A positioning server determines whether a terminal accesses a WiFi access point.

The positioning server determines whether the terminal accesses the WiFi access point. If the terminal accesses the WiFi access point, perform S1203, and if the terminal does not access the WiFi access point, perform S1202.

S1202. The positioning server performs positioning on the user terminal in a conventional positioning manner.

For example, the positioning server may position the user terminal in a conventional OTDOA positioning manner.

S1203. The terminal reports, by using LTE positioning protocol signaling, a coverage range of the WiFi access point that the terminal accesses to the positioning server.

S1204. The positioning server determines whether the coverage range of the WiFi access point is less than a threshold C-t.

The positioning server determines, according to the coverage range of the WiFi access point reported by the user terminal, whether the coverage range of the WiFi access point is less than the threshold C-t. If the coverage range of the WiFi access point is less than the threshold C-t, perform S1206, and if the coverage range of the WiFi access point is not less than the threshold C-t, perform S1205.

S1205. The positioning server performs OTDOA positioning on the terminal according to coexistence interference information of the terminal.

When the coverage range of the WiFi access point that the user terminal accesses is too large, a location of the user terminal may be far from a location of the WiFi access point that the user terminal accesses; therefore, the positioning server may position the user terminal in an OTDOA positioning manner and based on acquired coexistence interference information of the terminal.

S1206. The positioning server requests the WiFi access point to report its own geographic location or its own network address, and receives location information returned by the WiFi access point.

The positioning server may actively send, to the WiFi access point, a request message for reporting location information, and after receiving the foregoing request message sent by the positioning server, the WiFi access point sends its own location information to the positioning server.

S1207. The positioning server uses the location of the WiFi access point as a location of the terminal.

When the coverage range of the WiFi access point that the user terminal accesses is relatively small, the positioning server directly uses the location of the WiFi access point as the location of the terminal.

In this embodiment, when a user terminal accesses a WiFi access point, the terminal reports a coverage range of the WiFi access point that the terminal accesses, and when the coverage range of the WiFi access point is relatively small, a positioning server requests the WiFi access point to report its own geographic location or its own network address, and directly uses a location of the WiFi access point as a location of the terminal, which improves efficiency of terminal positioning.

Figure 13:
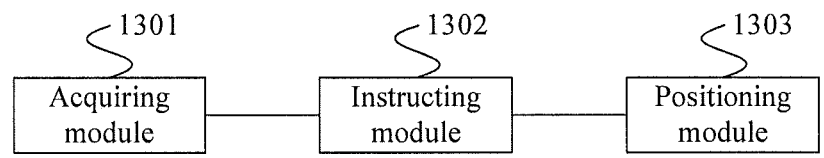
FIG. 13 is a schematic structural diagram of a positioning processing apparatus on a server side according to an embodiment of the present invention.

FIG. 13 is a schematic structural diagram of a positioning processing apparatus on a server side according to an embodiment of the present invention. As shown in FIG. 13, the positioning processing apparatus on a server side in this embodiment may include an acquiring module 1301, an instructing module 1302, and a positioning module 1303. The acquiring module 1301 is configured to acquire coexistence interference information of a terminal; the instructing module 1302 is configured to instruct, according to the coexistence interference information, the terminal to perform measurement on a suitable positioning signal resource; and the positioning module 1303 is configured to position the terminal based on a positioning measurement result reported by the terminal.

The positioning processing apparatus on a server side in this embodiment may be configured to execute the method in the method embodiment shown in FIG. 2, and has a corresponding functional module. An implementation principle and a to-be-achieved technical effect thereof are similar, and details are not described herein again.

For the positioning processing apparatus on a server side described above, if the coexistence interference information includes information about suitability of a frequency domain transmission resource, time domain transmission resource, and/or code domain transmission resource for the terminal, the instructing module 1302 may be specifically configured to designate, for the terminal according to the coexistence interference information, a suitable frequency domain transmission resource, time domain transmission resource, and/or code domain transmission resource as a positioning signal measurement resource suitable for the terminal to perform positioning measurement.

An implementation principle and a to-be-achieved technical effect of the positioning processing apparatus on a server side in this embodiment have been described above, and details are not described herein again.

For the positioning processing apparatus on a server side described above, the positioning module 1303 includes an auxiliary data providing unit, a time difference receiving unit, and a location calculating unit. The auxiliary data providing unit is configured to provide, for the terminal, a designated positioning signal measurement resource as auxiliary data for positioning measurement, where the auxiliary data includes at least sending timing and/or a sending frequency; the time difference receiving unit is configured to receive a time difference that is obtained by the terminal by means of measurement based on the auxiliary data and is of arrivals, at the terminal, of positioning signals from different positioning base stations; and the location calculating unit is configured to perform calculation according to the time difference to obtain a difference of distances between the terminal and the different positioning base stations, and determine a location of the terminal according to the difference of the distances.

The positioning processing apparatus on a server side in this embodiment may be configured to execute the method in the method embodiment shown in FIG. 3, and has a corresponding functional module. An implementation principle and a to-be-achieved technical effect thereof are similar, and details are not described herein again.

For the positioning processing apparatus on a server side described above, the acquiring module 1301 may be specifically configured to receive the coexistence interference information actively reported by the terminal.

An implementation principle and a to-be-achieved technical effect of the positioning processing apparatus on a server side in this embodiment have been described above, and details are not described herein again.

For the positioning processing apparatus on a server side described above, the acquiring module 1301 includes a sending unit and a receiving unit. The sending unit is configured to send, to the terminal, a request for reporting the coexistence interference information; and the receiving unit is configured to receive the coexistence interference information directly reported by the terminal, or forwarded by a base station, or forwarded by an MME and an OAM.

An implementation principle and a to-be-achieved technical effect of the positioning processing apparatus on a server side in this embodiment have been described above, and details are not described herein again.

For the positioning processing apparatus on a server side described above, the acquiring module 1301 may be specifically configured to receive the coexistence interference information of the terminal that is provided by a base station, an MME or an OAM.

An implementation principle and a to-be-achieved technical effect of the positioning processing apparatus on a server side in this embodiment have been described above, and details are not described herein again.

For the positioning processing apparatus on a server side described above, the acquiring module 1301 may be specifically configured to send, to a base station, an MME and an OAM, a request for reporting the coexistence interference information of the terminal; and receive the coexistence interference information sent by the base station, or forwarded by the MME and the OAM.

An implementation principle and a to-be-achieved technical effect of the positioning processing apparatus on a server side in this embodiment have been described above, and details are not described herein again.

For the positioning processing apparatus on a server side described above, the acquiring module 1301 may be specifically configured to receive coexistence interference information of a single terminal or multiple terminals that is provided by a base station, an MME or an OAM.

An implementation principle and a to-be-achieved technical effect of the positioning processing apparatus on a server side in this embodiment have been described above, and details are not described herein again.

For the positioning processing apparatus on a server side described above, the acquiring module 1301 may be specifically configured to receive signaling that carries the coexistence interference information and is sent by the base station, where the signaling includes information about a carrier list unsuitable or suitable when coexistence interference exists in the terminal, and/or information about a time domain resource unsuitable or suitable when coexistence interference exists in the terminal, and/or information about a code domain resource unsuitable or suitable when coexistence interference exists in the terminal; and use the included information as the coexistence interference information.

An implementation principle and a to-be-achieved technical effect of the positioning processing apparatus on a server side in this embodiment have been described above, and details are not described herein again.

For the positioning processing apparatus on a server side described above, the acquiring module 1301 further includes a coverage radius acquiring module, a location acquiring module, and a determining and triggering module. The coverage radius acquiring module is configured to, when it is identified that the terminal is in a coverage range of a WiFi access point, acquire a coverage radius of the WiFi access point; and the location acquiring module is configured to, when it is determined that the coverage radius of the WiFi access point is less than a set threshold, acquire a location of the WiFi access point and use the location of the WiFi access point as a location of the terminal; or the determining and triggering module is configured to, when it is determined that the coverage radius of the WiFi access point is not less than a set threshold, trigger the operation of acquiring the coexistence interference information of the terminal.

The positioning processing apparatus on a server side in this embodiment may be configured to execute the method in the method embodiment shown in FIG. 4, and has a corresponding functional module. An implementation principle and a to-be-achieved technical effect thereof are similar, and details are not described herein again.

For the positioning processing apparatus on a server side described above, the location acquiring module of the acquiring module 1301 further includes an access point location acquiring unit, a location returning unit, and a location acquiring unit. The access point location acquiring unit is configured to acquire, from the terminal, the location of the WiFi access point; the location returning unit is configured to send a location acquiring request to the WiFi access point and receive the location returned by the WiFi access point; and the location acquiring unit is configured to query a local database to acquire the location of the WiFi access point.

An implementation principle and a to-be-achieved technical effect of the positioning processing apparatus on a server side in this embodiment have been described above, and details are not described herein again.

Figure 14:
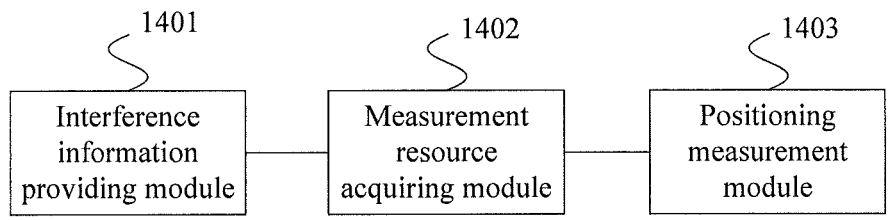
FIG. 14 is a schematic structural diagram of a positioning processing apparatus on a terminal side according to an embodiment of the present invention.

FIG. 14 is a schematic structural diagram of a positioning processing apparatus on a terminal side according to an embodiment of the present invention. As shown in FIG. 14, the positioning processing apparatus on a terminal side in this embodiment may include an interference information providing module 1401, a measurement resource acquiring module 1402, and a positioning measuring module 1403. The interference information providing module 1401 is configured to provide coexistence interference information of a terminal for a positioning server; the measurement resource acquiring module 1402 is configured to acquire a positioning signal measurement resource designated according to the coexistence interference information by the positioning server; and the positioning measuring module 1403 is configured to perform positioning measurement based on the designated positioning signal measurement resource.

The positioning processing apparatus on a terminal side in this embodiment may be configured to execute the method in the method embodiment shown in FIG. 5, and has a corresponding functional module. An implementation principle and a to-be-achieved technical effect thereof are similar, and details are not described herein again.

For the positioning processing apparatus on a terminal side described above, the interference information providing module 1401 may be specifically configured to, when a request, which is sent by the positioning server, for reporting the coexistence interference information is received, or the terminal determines that the coexistence interference information needs to be reported, directly report, or forward by using a base station, or forward by using an MME and an OAM, the coexistence interference information of the terminal to the positioning server.

An implementation principle and a to-be-achieved technical effect of the positioning processing apparatus on a terminal side in this embodiment have been described above, and details are not described herein again.

Figure 15:
FIG. 15 is a schematic structural diagram of a positioning system according to an embodiment of the present invention.

FIG. 15 is a schematic structural diagram of a positioning system according to an embodiment of the present invention. As shown in FIG. 15, the positioning system in this embodiment may include a positioning server 1501 and a user terminal 1502. In a specific application, the positioning system may further include devices such as a base station and a wireless local area network access point. For an implementation principle and a to-be achieved technical effect, reference may be made to the foregoing method embodiments, and details are not described herein again.

Figure 16:
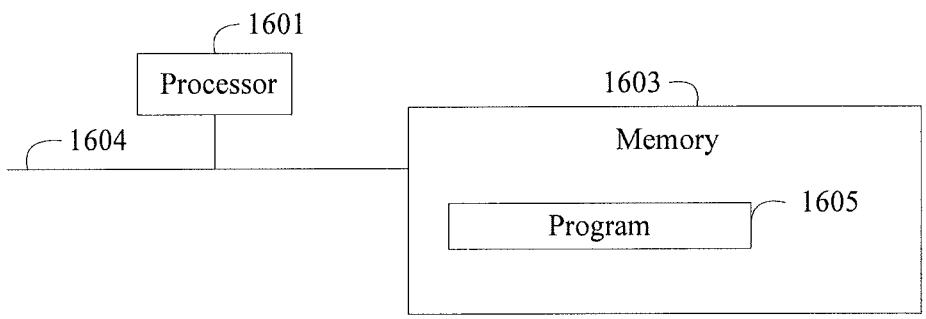
FIG. 16 is a schematic structural diagram of a positioning server according to an embodiment of the present invention.

FIG. 16 is a schematic structural diagram of a positioning server according to an embodiment of the present invention. The positioning server includes at least one processor 1601 (for example, a CPU), a memory 1603, and at least one communications bus 1604 that is configured to implement connection communication between apparatuses. The processor 1601 is configured to execute an executable module, such as a computer program, stored in the memory 1603. The memory 1603 may include a high-speed random access memory (RAM: Random Access Memory), or may include a non-volatile memory (non-volatile memory), such as at least one magnetic disk memory.

In some implementation manners, a program 1605 is stored in the memory 1603, and the program 1605 may be executed by the processor 1601. This program includes execution of a positioning processing method, where the method includes:

acquiring coexistence interference information of a terminal;

instructing, according to the coexistence interference information, the terminal to perform measurement on a suitable positioning signal resource; and positioning the terminal based on a positioning measurement result reported by the terminal.

For the foregoing program that executes the positioning processing method, preferably, if the coexistence interference information includes information about suitability of a frequency domain transmission resource, time domain transmission resource, and/or code domain transmission resource for the terminal, the instructing, according to the coexistence interference information, the terminal to perform measurement on a suitable positioning signal resource includes:

designating, for the terminal according to the coexistence interference information, a suitable frequency domain transmission resource, time domain transmission resource, and/or code domain transmission resource as a positioning signal measurement resource suitable for the terminal to perform positioning measurement.

For the foregoing program that executes the positioning processing method, preferably, the positioning the terminal based on a positioning measurement result reported by the terminal includes:

providing, for the terminal, a designated positioning signal measurement resource as auxiliary data for positioning measurement, where the auxiliary data includes at least sending timing and/or a sending frequency;

receiving a time difference that is obtained by the terminal by means of measurement based on the auxiliary data and is of arrivals, at the terminal, of positioning signals from different positioning base stations; and performing calculation according to the time difference to obtain a difference of distances between the terminal and the different positioning base stations, and determining a location of the terminal according to the difference of the distances.

For the foregoing program that executes the positioning processing method, preferably, the acquiring coexistence interference information of a terminal includes: receiving the coexistence interference information actively reported by the terminal.

For the foregoing program that executes the positioning processing method, preferably, the acquiring coexistence interference information of a terminal includes:

sending, to the terminal, a request for reporting the coexistence interference information; and receiving the coexistence interference information directly reported by the terminal, or forwarded by a base station, or forwarded by an MME and an OAM.

For the foregoing program that executes the positioning processing method, preferably, the acquiring coexistence interference information of a terminal includes:

receiving the coexistence interference information of the terminal that is provided by a base station, an MME or an OAM.

For the foregoing program that executes the positioning processing method, preferably, the acquiring coexistence interference information of a terminal includes:

sending, to a base station, an MME and an OAM, a request for reporting the coexistence interference information of the terminal; and receiving the coexistence interference information sent by the base station, or forwarded by the MME and the OAM.

For the foregoing program that executes the positioning processing method, preferably, the acquiring coexistence interference information of a terminal includes:

receiving coexistence interference information of a single terminal or multiple terminals that is provided by a base station, an MME or an OAM.

For the foregoing program that executes the positioning processing method, preferably, the receiving coexistence interference information provided by a base station includes:

receiving signaling that carries the coexistence interference information and is sent by the base station, where the signaling includes information about a carrier list unsuitable or suitable when coexistence interference exists in the terminal, and/or information about a time domain resource unsuitable or suitable when coexistence interference exists in the terminal, and/or information about a code domain resource unsuitable or suitable when coexistence interference exists in the terminal; and using the included information as the coexistence interference information.

For the foregoing program that executes the positioning processing method, preferably, before the acquiring coexistence interference information of a terminal, the method further includes:

when it is identified that the terminal is in a coverage range of a WiFi access point, acquiring a coverage radius of the WiFi access point; and when it is determined that the coverage radius of the WiFi access point is less than a set threshold, acquiring a location of the WiFi access point and using the location of the WiFi access point as a location of the terminal; or when it is determined that the coverage radius of the WiFi access point is not less than a set threshold, triggering the operation of acquiring the coexistence interference information of the terminal.

For the foregoing program that executes the positioning processing method, preferably, the acquiring a location of the WiFi access point includes:

acquiring, from the terminal, the location of the WiFi access point;

sending a location acquiring request to the WiFi access point and receiving the location returned by the WiFi access point; and querying a local database to acquire the location of the WiFi access point.

Figure 17:
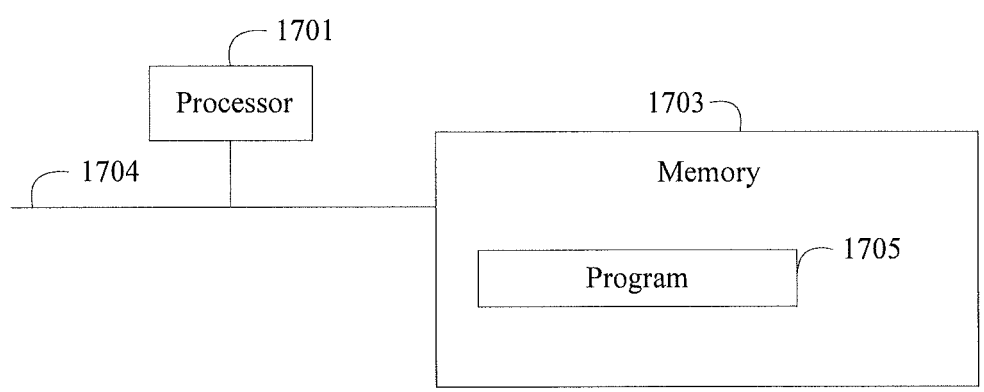
FIG. 17 is a schematic structural diagram of a terminal according to an embodiment of the present invention.

FIG. 17 is a schematic structural diagram of a terminal according to an embodiment of the present invention. The terminal includes at least one processor 1701 (for example, a CPU), a memory 1703, and at least one communications bus 1704 that is configured to implement connection communication between apparatuses. The processor 1701 is configured to execute an executable module, such as a computer program, stored in the memory 1703. The memory 1703 may include a high-speed random access memory (RAM: Random Access Memory), or may include a non-volatile memory (non-volatile memory), such as at least one magnetic disk memory.

In some implementation manners, a program 1705 is stored in the memory 1703, and the program 1705 may be executed by the processor 1701. This program includes execution of a positioning processing method, where the method includes:

providing coexistence interference information of a terminal for a positioning server;

acquiring a positioning signal measurement resource designated according to the coexistence interference information by the positioning server; and performing positioning measurement based on the designated positioning signal measurement resource.

For the foregoing program that executes the positioning processing method, preferably, the providing coexistence interference information of a terminal for a positioning server includes:

when a request, which is sent by the positioning server, for reporting the coexistence interference information is received, or the terminal determines that the coexistence interference information needs to be reported, directly reporting, or forwarding by using a base station, or forwarding by using a mobility management entity MME and an operation, administration and maintenance entity OAM, the coexistence interference information of the terminal to the positioning server.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof; however, these modifications or replacements do not make the essence of corresponding technical solutions depart from the scope of the technical solutions in the embodiments of the present invention.

What is claimed is:

1. A positioning processing method, comprising:
   acquiring coexistence interference information of a terminal;
   instructing, according to the coexistence interference information, the terminal to perform measurement on a suitable positioning signal resource; and
   positioning the terminal based on a positioning measurement result reported by the terminal,
   wherein, before acquiring the coexistence interference information of the terminal, the method further comprises:
      when the terminal is in a coverage range of a Wireless Fidelity (WiFi) access point, acquiring a coverage radius of the WiFi access point;
      when the coverage radius of the WiFi access point is less than a set threshold, acquiring a location of the WiFi access point and using the location of the WiFi access point as a location of the terminal, and
      when the coverage radius of the WiFi access point is not less than the set threshold, triggering an operation of acquiring the coexistence interference information of the terminal.

2. The positioning processing method according to claim 1, wherein if the coexistence interference information comprises information about suitability of a frequency domain transmission resource, time domain transmission resource, and/or code domain transmission resource for the terminal, the instructing, according to the coexistence interference information, the terminal to perform measurement on a suitable positioning signal resource comprises:
designating, for the terminal according to the coexistence interference information, a suitable frequency domain transmission resource, time domain transmission resource, and/or code domain transmission resource as a positioning signal measurement resource suitable for the terminal to perform positioning measurement.

3. The positioning processing method according to claim 1, wherein the positioning the terminal based on a positioning measurement result reported by the terminal comprises:
providing, for the terminal, a designated positioning signal measurement resource as auxiliary data for positioning measurement, wherein the auxiliary data comprises at least sending timing and/or a sending frequency;
receiving a time difference that is obtained by the terminal by means of measurement based on the auxiliary data and is of arrivals, at the terminal, of positioning signals from different positioning base stations; and
performing calculation according to the time difference to obtain a difference of distances between the terminal and the different positioning base stations, and determining a location of the terminal according to the difference of the distances.

4. The positioning processing method according to claim 1, wherein the acquiring coexistence interference information of a terminal comprises:
receiving the coexistence interference information actively reported by the terminal.

5. The positioning processing method according to claim 1, wherein the acquiring coexistence interference information of a terminal comprises:
sending, to the terminal, a request for reporting the coexistence interference information; and
receiving the coexistence interference information directly reported by the terminal, or forwarded by a base station, or forwarded by a mobility management entity MME and an operation, administration and maintenance entity OAM.

6. The positioning processing method according to claim 1, wherein the acquiring coexistence interference information of a terminal comprises:
receiving the coexistence interference information of the terminal that is provided by a base station, an MME or an OAM.

7. The positioning processing method according to claim 6, wherein the receiving coexistence interference information provided by a base station comprises:
receiving signaling that carries the coexistence interference information and is sent by the base station, wherein the signaling comprises information about a carrier list unsuitable or suitable when coexistence interference exists in the terminal, and/or information about a time domain resource unsuitable or suitable when coexistence interference exists in the terminal, and/or information about a code domain resource unsuitable or suitable when coexistence interference exists in the terminal; and using the comprised information as the coexistence interference information.

8. The positioning processing method according to claim 1, wherein the acquiring coexistence interference information of a terminal comprises:
sending, to a base station, an MME and an OAM, a request for reporting the coexistence interference information of the terminal; and
receiving the coexistence interference information sent by the base station, or forwarded by the MME and the OAM.

9. The positioning processing method according to claim 1, wherein the acquiring coexistence interference information of a terminal comprises:
receiving coexistence interference information of a single terminal or multiple terminals that is provided by a base station, an MME or an OAM.

10. The positioning processing method according to claim 1, wherein the acquiring the location of the WiFi access point comprises:
acquiring, from the terminal, the location of the WiFi access point;
sending a location acquiring request to the WiFi access point and receiving the location returned by the WiFi access point; and
querying a local database to acquire the location of the WiFi access point.

11. A positioning processing method, comprising:
providing coexistence interference information of a terminal for a positioning server;
acquiring a positioning signal measurement resource designated according to the coexistence interference information by the positioning server; and
performing positioning measurement based on the designated positioning signal measurement resource,
wherein, before providing the coexistence interference information of the terminal for the positioning server, the method further comprises:
when the terminal is in a coverage range of a Wireless Fidelity (WiFi) access point, providing a coverage radius of the WiFi access point;
when the coverage radius of the WiFi access point is less than a set threshold, a location of the WiFi access point is used as a location of the terminal, and
when the coverage radius of the WiFi access point is not less than the set threshold, providing the coexistence interference information of the terminal for the positioning server.

12. The positioning processing method according to claim 11, wherein the providing coexistence interference information of a terminal for a positioning server comprises:
when a request, which is sent by the positioning server, for reporting the coexistence interference information is received, or the terminal determines that the coexistence interference information needs to be reported, directly reporting, or forwarding by using a base station, or forwarding by using a mobility management entity MME and an operation, administration and maintenance entity OAM, the coexistence interference information of the terminal to the positioning server.

13. A positioning processing apparatus on a server side, comprising:
a memory storing instructions; and
at least one processor connected to the memory, the at least one processor configured to, including configured by the instructions to:
acquire coexistence interference information of a terminal,
instruct, according to the coexistence interference information, the terminal to perform measurement on a suitable positioning signal resource,
position the terminal based on a positioning measurement result reported by the terminal, when the terminal is in a coverage range of a Wireless Fidelity (WiFi) access point, acquire a coverage radius of the WiFi access point, when the coverage radius of the WiFi access point is less than a set threshold, acquire a location of the WiFi access point and use the location of the WiFi access point as a location of the terminal, and when the coverage radius of the WiFi access point is not less than the set threshold, trigger an operation of acquiring the coexistence interference information of the terminal.

14. The positioning processing apparatus on a server side according to claim 13, wherein if the coexistence interference information comprises information about suitability of a frequency domain transmission resource, time domain transmission resource, and/or code domain transmission resource for the terminal, the at least one processor is further configured to designate, for the terminal according to the coexistence interference information, a suitable frequency domain transmission resource, time domain transmission resource, and/or code domain transmission resource as a positioning signal measurement resource suitable for the terminal to perform positioning measurement.

15. The positioning processing apparatus on a server side according to claim 13, wherein the at least one processor is further configured to:
provide, for the terminal, a designated positioning signal measurement resource as auxiliary data for positioning measurement, wherein the auxiliary data comprises at least sending timing and/or a sending frequency;
receive a time difference that is obtained by the terminal by means of measurement based on the auxiliary data and is of arrivals, at the terminal, of positioning signals from different positioning base stations; and
perform calculation according to the time difference to obtain a difference of distances between the terminal and the different positioning base stations, and determine a location of the terminal according to the difference of the distances.

16. The positioning processing apparatus on a server side according to claim 13, wherein the at least one processor is further configured to receive the coexistence interference information actively reported by the terminal.

17. The positioning processing apparatus on a server side according to claim 13, wherein the at least one processor is further configured to send, to the terminal, a request for reporting the coexistence interference information, and receive the coexistence interference information directly reported by the terminal, or forwarded by a base station, or forwarded by a mobility management entity MME and an operation, administration and maintenance entity OAM.

18. The positioning processing apparatus on a server side according to claim 17, wherein the at least one processor is further configured to receive signaling that carries the coexistence interference information and is sent by the base station, wherein the signaling comprises information about a carrier list unsuitable or suitable when coexistence interference exists in the terminal, and/or information about a time domain resource unsuitable or suitable when coexistence interference exists in the terminal, and/or information about a code domain resource unsuitable or suitable when coexistence interference exists in the terminal, and use the comprised information as the coexistence interference information.

19. The positioning processing apparatus on a server side according to claim 13, wherein the at least one processor is further configured to receive the coexistence interference information of the terminal that is provided by a base station, an MME or an OAM.

20. The positioning processing apparatus on a server side according to claim 13, wherein the at least one processor is further configured to send, to a base station, an MME and an OAM, a request for reporting the coexistence interference information of the terminal, and receive the coexistence interference information sent by the base station, or forwarded by the MME and the OAM.

21. The positioning processing apparatus on a server side according to claim 13, wherein the at least one processor is further configured to receive coexistence interference information of a single terminal or multiple terminals that is provided by a base station, an MME or an OAM.

22. The positioning processing apparatus on a server side according to claim 13, wherein the at least one processor is further configured to:
acquire, from the terminal, the location of the WiFi access point;
send a location acquiring request to the WiFi access point and receive the location returned by the WiFi access point; and
query a local database to acquire the location of the WiFi access point.

23. A positioning processing apparatus on a terminal side, comprising:
a memory; and
at least one processor connected to the memory, the at least one processor configured to, including configured by the instructions to:
provide coexistence interference information of a terminal for a positioning server;
acquire a positioning signal measurement resource designated according to the coexistence interference information by the positioning server; and
perform positioning measurement based on the designated positioning signal measurement resource,
wherein the at least one processor, when the terminal is in a coverage range of a Wireless Fidelity (WiFi) access point, is further configured to provide a coverage radius of the WiFi access point to the positioning server before the coexistence interference information of the terminal is provided for the positioning server,
when the coverage radius of the WiFi access point is less than a set threshold, a location of the WiFi access point is used as a location of the terminal, and
when the coverage radius of the WiFi access point is not less than the set threshold, the at least one processor provides the coexistence interference information of the terminal for the positioning server.

24. The positioning processing apparatus on a terminal side according to claim 23, wherein the at least one processor is further configured to, when a request, which is sent by the positioning server, for reporting the coexistence interference information is received, or the terminal determines that the coexistence interference information needs to be reported, directly report, or forward by using a base station, or forward by using a mobility management entity MME and an operation, administration and maintenance entity OAM, the coexistence interference information of the terminal to the positioning server.

* * * * *